US011210969B1

(12) United States Patent
Al-Saggaf et al.

(10) Patent No.: US 11,210,969 B1
(45) Date of Patent: Dec. 28, 2021

(54) CENTER OF GRAVITY BASED CONTROL APPARATUS FOR RESEARCH AND EDUCATION

(71) Applicant: King Abdulaziz University, Jeddah (SA)

(72) Inventors: Ubaid M. Al-Saggaf, Jeddah (SA); Abdulrahman U. Alsaggaf, Jeddah (SA); Asmaa Ubaid Al-Saggaf, Jeddah (SA); Ahmed Ubaid Al-Saggaf, Jeddah (SA); Zahraa Ubaid Al-Saggaf, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/348,834

(22) Filed: Jun. 16, 2021

(51) Int. Cl.
*G09B 23/08* (2006.01)
*G01B 21/22* (2006.01)

(52) U.S. Cl.
CPC ............. *G09B 23/08* (2013.01); *G01B 21/22* (2013.01)

(58) Field of Classification Search
None
See application file for complete search history.

(56) References Cited

U.S. PATENT DOCUMENTS

| 6,170,345 B1 * | 1/2001 | Kerner | G01P 21/025 |
| | | | 702/87 |
| 6,913,228 B2 | 7/2005 | Lee et al. | |
| 8,322,477 B2 | 12/2012 | Kamen et al. | |
| 8,567,535 B2 | 10/2013 | Takenaka et al. | |
| 9,216,764 B2 | 12/2015 | Ito et al. | |
| 9,334,002 B2 | 5/2016 | Seo et al. | |
| 10,565,899 B1 * | 2/2020 | Dignam | G09B 23/181 |
| 2009/0107240 A1 * | 4/2009 | Senba | A61G 5/04 |
| | | | 73/514.36 |

FOREIGN PATENT DOCUMENTS

| CN | 1588493 A | * | 3/2005 |
| CN | 1716341 A | * | 1/2006 |

(Continued)

OTHER PUBLICATIONS

"Model 505: Inverted Pendulum", ECP, Educational Control Products—Control Systems—Inverted Pendulum, www.ecpsystems.com/controls_pendulum.htm, Feb. 5, 2021, 2 pages.

*Primary Examiner* — Lina M Cordero
(74) *Attorney, Agent, or Firm* — Oblon, McClelland, Maier & Neustadt, L.L.P.

(57) ABSTRACT

An educational tool for testing and demonstrating center of gravity based control. The educational tool includes a swing, a rod assembly operatively connected to the swing, a motor operatively connected to the rod assembly, at least one encoder for generating position signals, an interface box operatively connected to the motor and the encoder, and a computing device operatively connected to the interface box. The computing device receives the position signals from the interface box, analyze the position signals to determine a center of gravity of the swing and the rod assembly, and generate motor control signals to adjust the swing and the rod assembly to a stable pose. The interface box transmits the motor control signals to the motor and transmits the position signals from the encoder to the computing device.

20 Claims, 16 Drawing Sheets

(56) References Cited

FOREIGN PATENT DOCUMENTS

| | | | | |
|---|---|---|---|---|
| CN | 2884387 | Y | * | 3/2007 |
| CN | 1952996 | A | * | 4/2007 |
| CN | 201449692 | U | | 5/2010 |
| CN | 103420138 | A | | 12/2013 |
| CN | 105608980 | B | * | 5/2018 |
| CN | 110220643 | A | | 9/2019 |
| CN | 212134038 | U | | 12/2020 |
| JP | 6370238 | B2 | | 8/2018 |

* cited by examiner

CENTER OF GRAVITY BASED CONTROL APPARATUS FOR RESEARCH AND EDUCATION

BACKGROUND

Technical Field

The present disclosure is directed to a center of gravity based control apparatus for research and education, and a method for testing and demonstrating the center of gravity based control.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Underactuated systems control is an active field of research due to its broad applications in aerospace, marine vehicles, and robotics. Examples of underactuated systems include humanoids, walking robots, acrobatic robots, space robots, flexible-link robots, helicopters, satellites, spacecraft, and underactuated marine vehicles. Typically, objects rotate around their Center of Gravity (CG), and a force applied to the CG causes the object to move in a pure translation mode. The CG location is essential to determining an object's movement characteristics and is crucial in designing and controlling an object. For example, in an aircraft, knowing the location of the center of gravity is critical in determining the size and placement of control surfaces. In a rocket, aligning the direction of a rocket motor's thrust to push precisely through the center of gravity of the rocket is essential in achieving a straight flight. In the automotive industry, the CG height is an important design parameter as a lower CG gives more stability to the vehicle. The center of gravity based control, where a change of the CG control movements, is used in several systems and applications.

Computer simulations are used to build an understanding of physical systems in the field of research and education. However, such simulations cannot provide in-depth insight into real control problems. The quality of research and education depends highly on the availability of physical systems.

CN110220643A describes a center of mass measuring device having a servo motor and an encoder. A seat connected to the motor and encoder is provided which appears to weigh a body placed upon the seat. This reference does not mention a disc shaped mass on a rod which is used to change the center of mass or a user interface configured to actuate the motor to rotate a gear unit, wirelessly receive signals from a first encoder and a second encoder; and display the center of gravity of the mass and rod.

CN103420138A describes a device for turning glass sheets which includes a rotating shaft (2) with bearings connected to a carrier arm (3). This reference does not mention a disc shaped mass on a rod which is used to change the center of mass or a user interface configured to actuate a motor to rotate a gear unit, wirelessly receive signals from a first encoder and a second encoder; and display the center of gravity of the mass and rod.

CN212134038U describes a rotating shaft service life testing machine having a servo motor and an arm extending from a shaft which is rotated by the motor to measure torque. This reference does not mention a disc shaped mass on a rod which is used to change the center of mass or a user interface configured to actuate a motor to rotate a gear unit, wirelessly receive signals from a first encoder and a second encoder; and display the center of gravity of the mass and rod.

CN201449692U describes an inverted pendulum with a variable gravity center with two moving sliding tracks. A pendulum rod extends from a rotating shaft. An angle encoder measures the angle of the pendulum. This reference does not mention a disc shaped mass on a rod which is used to change the center of mass or a user interface configured to actuate a motor to rotate a gear unit, wirelessly receive signals from a first encoder and a second encoder; and display the center of gravity of the mass and rod.

Each of the aforementioned patent references suffers from one or more drawbacks hindering their adoption. Accordingly, it is one object of the present disclosure to provide methods and systems for testing and demonstrating the center of gravity based control using an apparatus that is a reliable, straightforward design, and clear structure. Moreover, there is a need to provide an experimental set up for research and education to study the balance and control of a pose of a system based on the center of gravity.

SUMMARY

In an exemplary embodiment, an educational tool for testing and demonstrating center of gravity based control is described. The educational tool includes a swing having a first swing end and a second swing end. The educational tool further includes a rod assembly operatively connected to the swing, a motor operatively connected to the rod assembly, at least one encoder configured to generate position signals, an interface box operatively connected to the motor and the at least one encoder, and a computing device operatively connected to the interface box. The computing device includes circuitry and program instructions, which when executed by one or more processors, are configured to receive the position signals from the interface box, analyze the position signals to determine a center of gravity of the swing and the rod assembly, and generate motor control signals configured to adjust the swing and the rod assembly to a stable pose. The interface box is configured to transmit the motor control signals to the motor and transmit the position signals from the at least one encoder to the computing device.

In another exemplary embodiment, a method for testing and demonstrating center of gravity based control by an educational tool is described. The method includes connecting a first adjustment hole of a first adjustable strut to a first upper end of a first support blade by a first bearing and connecting a second adjustment hole of a second adjustable strut to a second upper end of a second support blade by a second bearing so that the first adjustment hole and the second adjustment hole are at equal heights from a stand holding the first support blade and the second support blade. The method further includes selecting a rod having a rod length, screwing the rod into a threaded hole of a cylindrical rod fixation, screwing a thread bar into a threaded cavity end of the rod, selecting a disc shaped mass having a threaded central bore, screwing the threaded central bore of the disc shaped mass onto the thread bar, and reading a position marking of the thread bar where the disc shaped mass intersects the thread bar. The method further includes connecting a first encoder to the first adjustable strut and a second encoder to the cylindrical rod fixation, connecting the first encoder and the second encoder to an interface box, connecting a motor to the interface box, and connecting a computing device to the interface box. The method further includes receiving, by the interface box, a first position signal from the first encoder and a second position signal from the second encoder, and transmitting, by the interface box, the first position signal and the second position signal to the computing device. The method further includes receiving, by the computing device, the first position signal and the second position signal. The method further includes receiving, by the computing device, a first identification code of the first encoder, a second identification code of the second encoder, a motor control signal amplitude and a motor control signal frequency. The method further includes receiving, by the computing device, a first set of user inputs including at least a height of an adjustment hole, the rod length, a weight of the disc shaped mass and the position marking. The method further includes analyzing, by the computing device, the first position signal, the second position signal and the first set of user inputs to determine the center of gravity of a swing and the rod. The method further includes generating motor control signals configured to adjust the center of gravity to a stable pose of the swing and the rod, and transmitting, by the interface box, the motor control signals to the motor.

In another exemplary embodiment, an educational tool system for testing and demonstrating center of gravity based control is described. The educational tool system includes a swing having a first swing end and a second swing end, and a rod assembly operatively connected to the swing, where rotational changes of the rod assembly cause the swing to assume different poses. The educational tool system includes a motor operatively connected to the rod assembly, at least one encoder configured to generate position signals, an interface box operatively connected to the motor and the at least one encoder, and a computing device operatively connected to the interface box. The computing device includes circuitry and program instructions, which when executed by one or more processors, are configured to receive the position signals from the interface box, analyze the position signals to determine a center of gravity of the swing and the rod assembly and generate motor control signals configured to adjust the swing and the rod assembly to a stable pose. The interface box is configured to transmit the motor control signals to the motor and transmit the position signals from the at least one encoder to the computing device.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
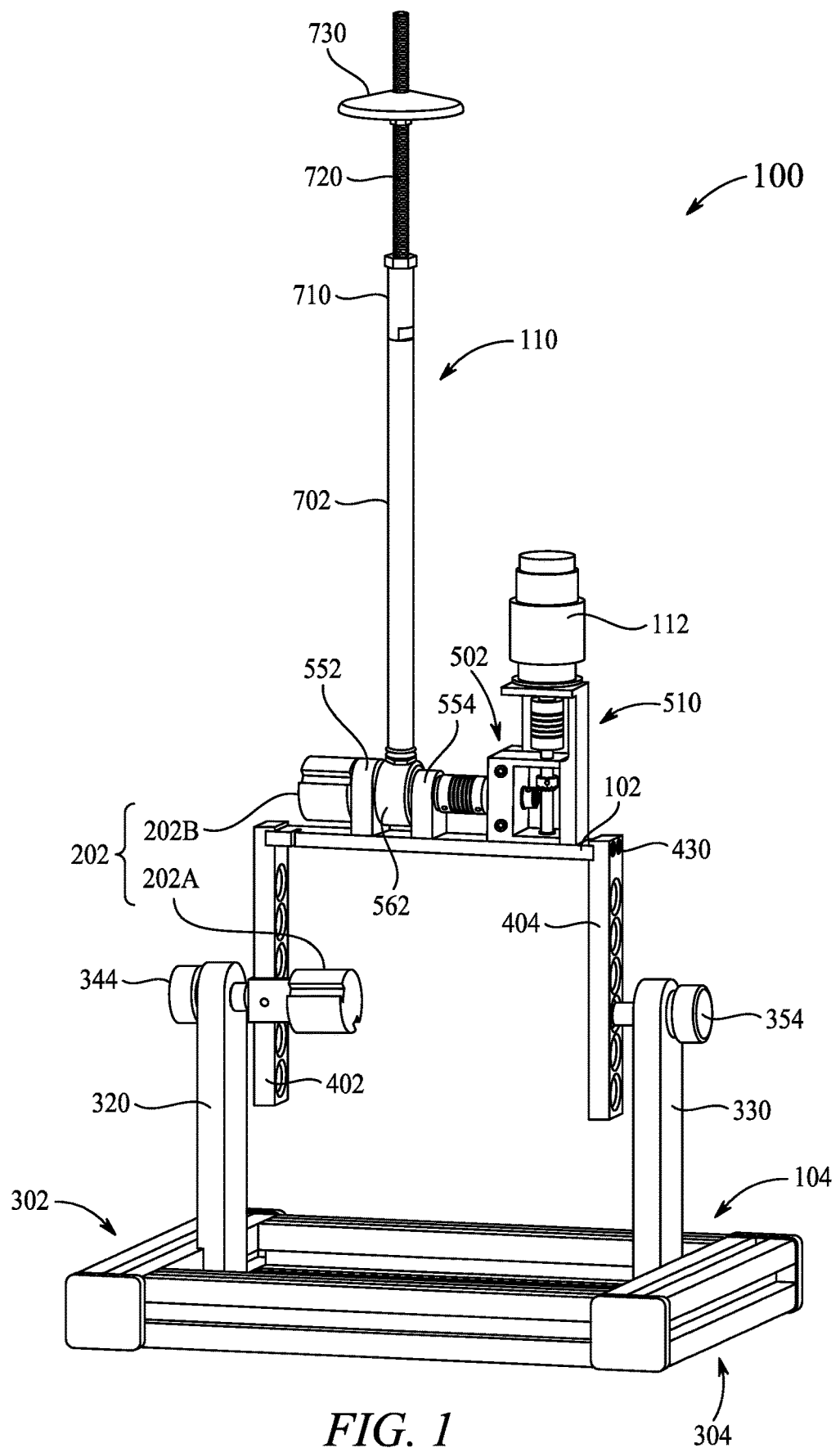
FIG. 1 is a perspective view of a first configuration of an educational tool, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a device for testing and demonstrating center of gravity based control and method for testing and demonstrating center of gravity based control by the device. The device is a physical research lab system that can accurately replicate theories and bring engineering mathematics and concepts to life.

Referring to FIG. 1, a perspective view of an educational tool 100 is illustrated. The educational tool 100 is used for testing and demonstrating center of gravity based control in research labs. Further, the educational tool 100 provides an experimental platform for research and teaching relating to balancing and controlling a pose of a system utilizing center of gravity based control. The educational tool 100 is non-linear and underactuated as the educational tool 100 has lower number of actuators compared to the available degrees of freedom in the known systems. The educational tool 100 is used for verifying the correctness and feasibility of theory and methods in the control field. The educational tool 100 of the present disclosure has the advantages of a reliable, straightforward design, and clear structure.

The educational tool 100 includes a swing 102 that is supported by a stand 104 on a floor or a planar surface. The swing 102 is operatively and rotatably supported on the stand 104. The educational tool 100 further includes a rod assembly 110 operatively connected to the swing 102, and a motor 112 supported on the swing 102 and operatively connected to the rod assembly 110. The swing 102, the rod assembly 110, and the motor 112 together constitute essential elements of the educational tool 100. The educational tool 100 is used to test and demonstrate the center of gravity based control using the swing 102, the rod assembly 110 and the motor 112. The motor 112 is used to provide a drive power to rotate the rod assembly 110 with respect to the swing 102 to make the swing 102 take a stable pose based on an angular position of the rod assembly 110. Rotational changes of the rod assembly 110 cause the swing 102 to assume different poses. The angular position may be defined as an angle at which the swing 102 may take the stable pose as the center of gravity of the swing 102 and the center of gravity of the rod assembly 110 fall on a same plane. The angular position of the rod assembly 110 may be further defined as an angle between a plane defined by the swing 102 and a plane defined by the position of the rod assembly 110.

The educational tool 100 has two possible configurations, and a first configuration of the educational tool 100 is shown in FIG. 1. A second configuration of the educational tool 100 is described in detail with reference to FIG. 10. The educational tool 100 is designed in such a way that the configuration of the educational tool 100 can be easily changed from the first configuration to the second configuration, and vice versa. Changing the configuration will change dynamics of the educational tool 100, hence gives a new control design problem. In the first configuration of the educational tool 100, the swing 102 and the rod assembly 110 are supported on the stand 104 in an inverted U-shape.

Figure 2:
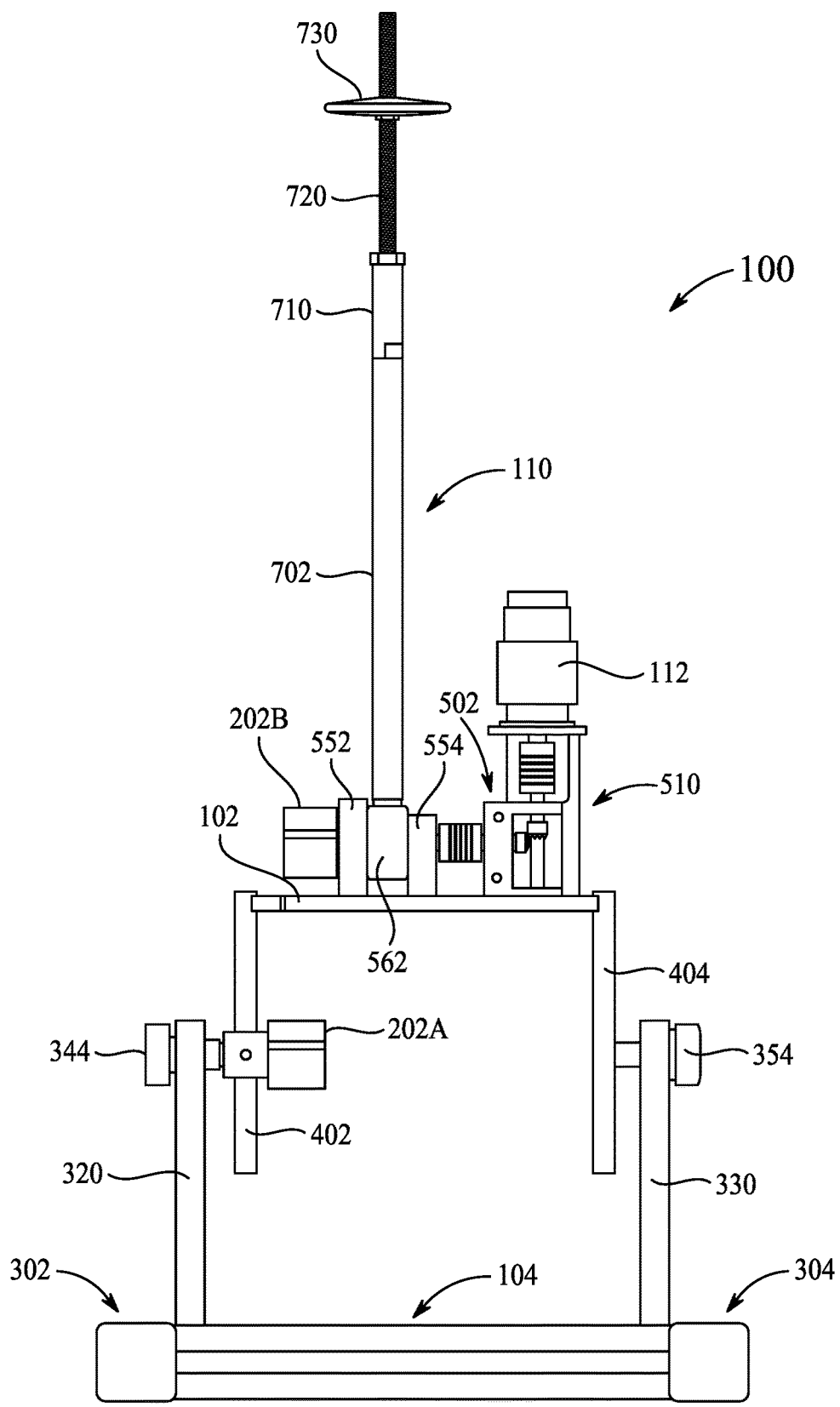
FIG. 2 is a front view of the first configuration of the educational tool, according to certain embodiments.

Referring to FIG. 2, a front view of the first configuration of the educational tool 100 is illustrated. Referring to FIG. 1 and FIG. 2, the educational tool 100 includes at least one encoder 202 configured to generate position signals. The at least one encoder 202 is configured to generate the signals indicative of the position of the swing 102, the rod assembly 110, or a combination thereof. According to the present disclosure, the educational tool 100 includes a first encoder 202A configured to generate signals indicative of position of the swing 102 and a second encoder 202B configured to generate signals indicative of position of the rod assembly 110. Particularly, the first encoder 202A is configured to generate a first position signal based on the position of the swing 102 and the second encoder 202B is configured to generate a second position signal based on the position of the rod assembly 110. In one aspect, the first encoder 202A may be configured to generate signals indicative of an angular position of the swing 102 with respect to a vertical plane or a horizontal plane defined by the stand 104 and the second encoder 202B may be configured to generate signals indicative of an angular position of the rod assembly 110 with respect to the swing 102. In another aspect, the educational tool 100 may include one or more sensors, position detecting mechanisms, or a combination thereof to generate signals indicative of the positions of the swing 102 and the rod assembly 110.

Figure 3:
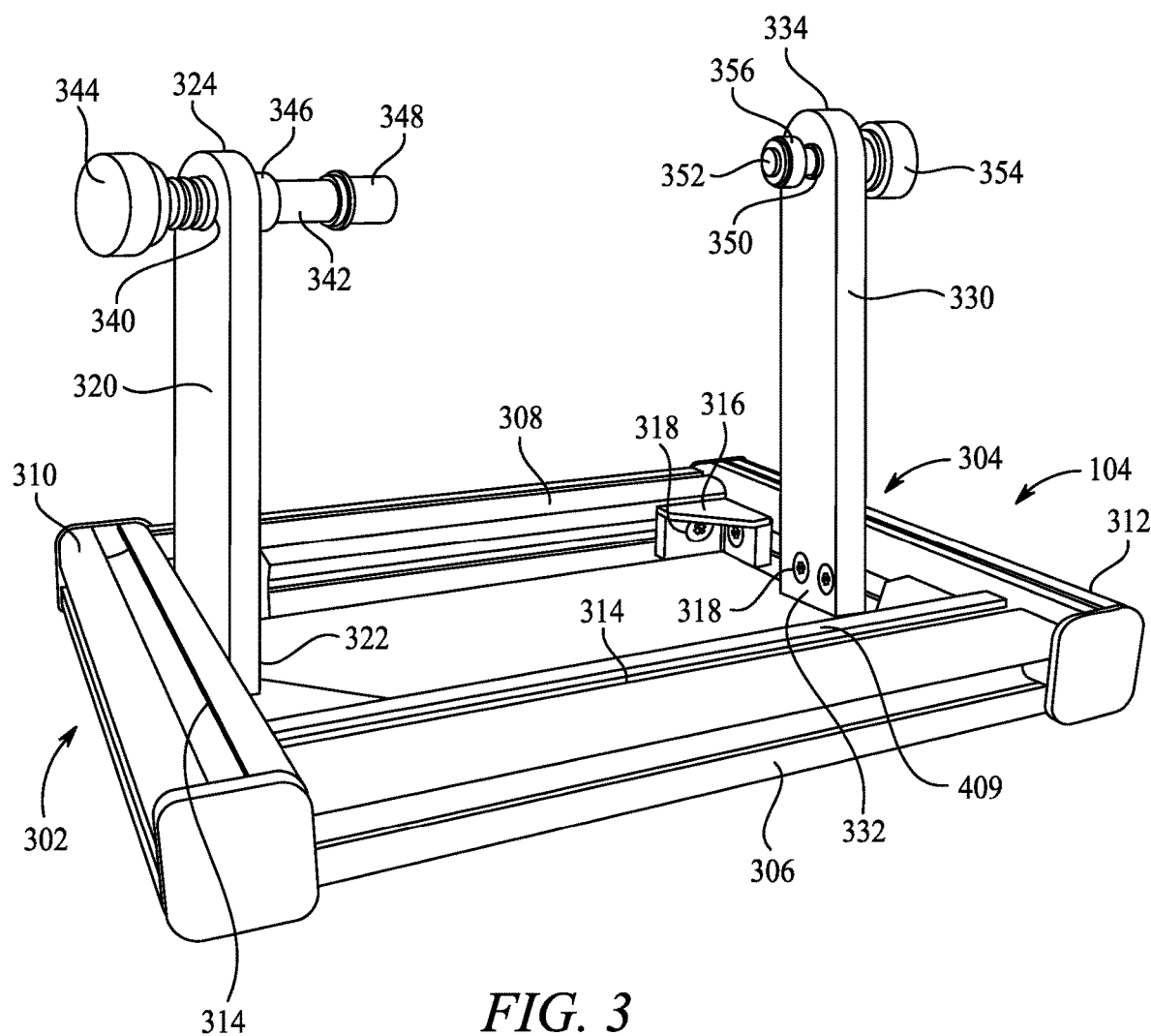
FIG. 3 is an enlarged perspective view of a stand of the educational tool, according to certain embodiments.

Referring to FIG. 3, an enlarged perspective view of the stand 104 of the educational tool 100 is illustrated. Referring to FIG. 1 to FIG. 3, the educational tool 100 includes the stand 104 having a first stand end 302 and a second stand end 304. The stand 104 is made in a rectangular shape to support the educational tool 100 on the floor or the planar surface. The stand includes a first longer leg 306 and a second longer leg 308 disposed parallel to each other, and together define the first stand end 302 and the second stand end 304. The stand 104 further includes a first shorter leg 310 connected to the first longer leg 306 and the second longer leg 308 at the first stand end 302, and a second shorter leg 312 connected to the first longer leg 306 and the second longer leg 308 at the second stand end 304. Each of the first longer leg 306, the second longer leg 308, the first shorter leg 310, and the second shorter leg 312 has a rounded square shape cross section and includes a groove 314 on each of four sides of the rounded square shape. The groove 314 on each side of the first longer leg 306, the second longer leg 308, the first shorter leg 310, and the second shorter leg 312 is configured to movably and adjustably support the swing 102, the rod assembly 110, and the motor 112 of the educational tool 100 on the stand 104. In an aspect, the first shorter leg 310 and the second shorter leg 312 may be removably attached to the first longer leg 306 and the second longer leg 308 using one or more coupling members 316. Each coupling member 316 is configured to engage a shorter leg and a longer leg. As shown in FIG. 3, the coupling member 316 is configured to engage with the groove 314 provided in each of the second longer leg 308 and the second shorter leg 312 using fastening members 318. In one aspect, the fastening members 318 may be screws, nuts and bolts, snap fit mechanisms, press fit mechanisms, or any other detachably attaching mechanisms known to a person ordinary skill in the art. In another aspect, the stand 104 may be formed in the shape of a square, or any other polygon shape with multiple leg members of equal length or varying length.

The educational tool 100 further includes a first support blade 320 having a first lower end 322 and a first upper end 324, and a second support blade 330 having a second lower end 332 and a second upper end 334. Each of the first support blade 320 and the second support blade 330 is an elongated solid body having a rectangular cross section. In another aspect, each of the first support blade 320 and the second support blade 330 may be a hollow body having a square cross section, I-section, C-section, or any other shape known in the art. The first lower end 322 of the first support blade 320 and the second lower end 332 of the second support blade 330 are configured to removably and adjustably couple with the stand 104. Particularly, the first lower end 322 of the first support blade 320 is configured to engage with the groove 314 provided in the first shorter leg 310 using fastening members (not shown), and the second lower end 332 of the second support blade 330 is configured to engage with the groove 314 provided in the second shorter leg 312 using fastening members 318. In an aspect, the fastening members 318 may be screws, nuts and bolts, snap fit mechanisms, press fit mechanisms, or any other mechanisms known in the art. The first lower end 322 of the first support blade 320 is perpendicularly attached to the first shorter leg 310 of the stand 104 at the first stand end 302 thereof, and the second lower end 332 of the second support blade 330 is perpendicularly attached to the second shorter leg 312 of the stand 104 at the second stand end 304 thereof. Further, the second support blade 330 is parallel to and extends in the same direction as the first support blade 320. In another aspect, the first support blade 320 and the second support blade 330 may be connected to the first longer leg 306 and the second longer leg 308, respectively. As such, the stand 104 provides flexibility to a user to couple the first support blade 320 and the second support blade 330 anywhere on the stand 104 based on experimental requirements.

The first upper end 324 of the first support blade 320 includes a first through hole 340 configured to receive a first threaded axle 342 therethrough. The first threaded axle 342 includes a first end configured to threadably engage with a first knob 344 and a second end configured to support a first bearing 346. The second end of the first threaded axle 342 extends away from the first bearing 346 to support a bushing 348. The second upper end 334 of the second support blade 330 includes a second through hole 350 configured to receive a second threaded axle 352 therethrough. The second threaded axle 352 includes a first end configured to threadably engage with a second knob 354 and a second end configured to support a second bearing 356. The first threaded axle 342 and the second threaded axle 352 are configured to rigidly support the swing 102, the rod assembly 110 and the motor 112 on the stand 104. The first knob 344 is used to tighten the first threaded axle 342 with the first support blade 320 and the second knob 354 is used to tighten the second threaded axle 352 with the second support blade 330.

Figure 4:
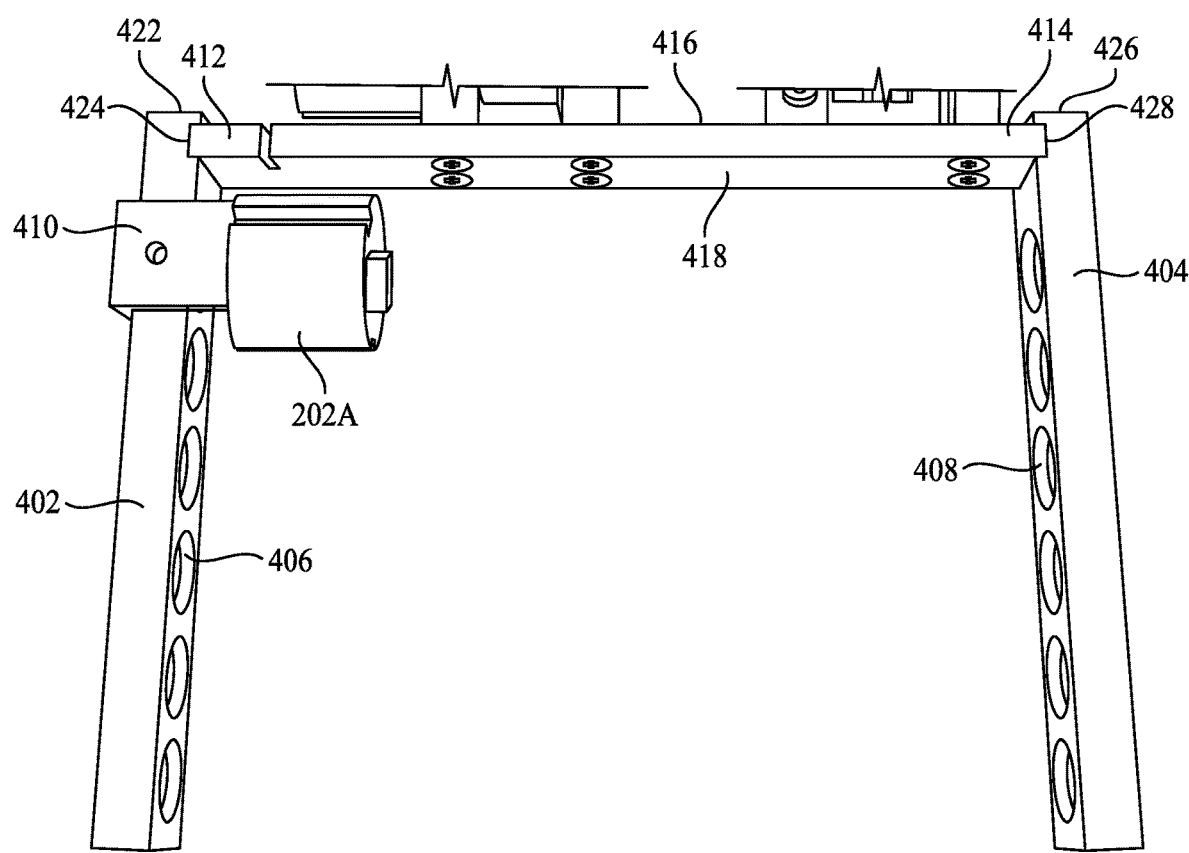
FIG. 4 is an enlarged perspective view of a swing of the educational tool, according to certain embodiments.

Referring to FIG. 4, an enlarged perspective view of the swing 102 is illustrated. Referring to FIG. 1 to FIG. 4, the educational tool 100 further includes a first adjustable strut 402 attached to the first upper end 324 of the first support blade 320 by the first bearing 346, and a second adjustable strut 404 attached to the second upper end 334 of the second support blade 330 by the second bearing 356. Each of the first adjustable strut 402 and the second adjustable strut 404 has a plurality of adjustment holes. The plurality of adjustment holes configured for connecting the first adjustable strut 402 and the second adjustable strut 404 to different heights from a base 409 (shown in FIG. 3) of the stand 104. In one aspect, the base 409 of the stand 104 may be defined as a horizontal plane defined by a top surface of the first longer leg 306, the second longer leg 308, the first shorter leg 310, and the second shorter leg 312. In another aspect, the base 409 of the stand 104 may be defined as the floor or the planar surface on which the stand 104 is placed. Particularly, the first adjustable strut 402 has a set of first adjustment holes 406 and the second adjustable strut 404 has a set of second adjustment holes 408. Each first adjustment hole 406 of the set of first adjustment holes 406 is defined in the first adjustable strut 402 at equidistance from adjacent first adjustment hole 406. Similarly, each second adjustment hole 408 of the set of second adjustment holes 408 is defined in the second adjustable strut 404 at equidistance from adjacent second adjustment hole 408. Further, the first adjustment holes 406 and the second adjustment holes 408 are defined in the first adjustable strut 402 and the second adjustable strut 404, respectively, at equal heights from the base 409 of the stand 104. Each first adjustment hole 406 of the first adjustable strut 402 is configured to receive the first bearing 346 and each second adjustment hole 408 of the second adjustable strut 404 is configured to receive the second bearing 356, such that the swing 102, the rod assembly 110, and the motor 112 are rotatably supported on the stand 104. Changing the first adjustment hole 406 of the first adjustable strut 402 and the second adjustment hole 408 the second adjustable strut 404 to different heights from the base 409 of the stand 104 changes the center of gravity of the swing 102 and rod assembly 110.

The first encoder 202A of the educational tool 100 is attached to the first adjustable strut 402 by a bracket 410. In an aspect, the bracket 410 may be attached to the first adjustable strut 402 by fastening members, a press fit mechanism, a snap fit mechanism, or any other mechanisms known in the art. Further, the first encoder 202A is operatively connected to the bushing 348 supported on the first threaded axle 342, such that the first encoder 202A is configured to generate the signals indicative of the position or rotational movement of the first adjustable strut 402 about the first threaded axle 342, and hence the position or rotational movement of the swing 102.

The educational tool 100 further includes the swing 102 having a first swing end 412 and a second swing end 414. The swing 102 is an elongated rectangular body having a top surface 416 and a bottom surface 418. The swing 102 is configured to support the rod assembly 110 and the motor 112 of the educational tool 100 on the top surface 416 thereof. The swing 102 is also designed in such a way to support the rod assembly 110 and the motor 112 on the bottom surface 418 thereof. Particularly, the rod assembly 110 is operatively connected to the swing 102. The first adjustable strut 402 has a first upper strut end 422 having a first slot 424 configured to receive the first swing end 412 of the swing 102. Similarly, the second adjustable strut 404 has a second upper strut end 426 having a second slot 428 configured to receive the second swing end 414 of the swing 102. The first slot 424 and the second slot 428 help the first adjustable strut 402 and the second adjustable strut 404, respectively, to firmly couple with the swing 102. Further, the first swing end 412 and the second swing end 414 of the swing 102 are detachably coupled to the first adjustable strut 402 and the second adjustable strut 404, respectively, using fasteners 430 (shown in FIG. 1).

Figure 5:
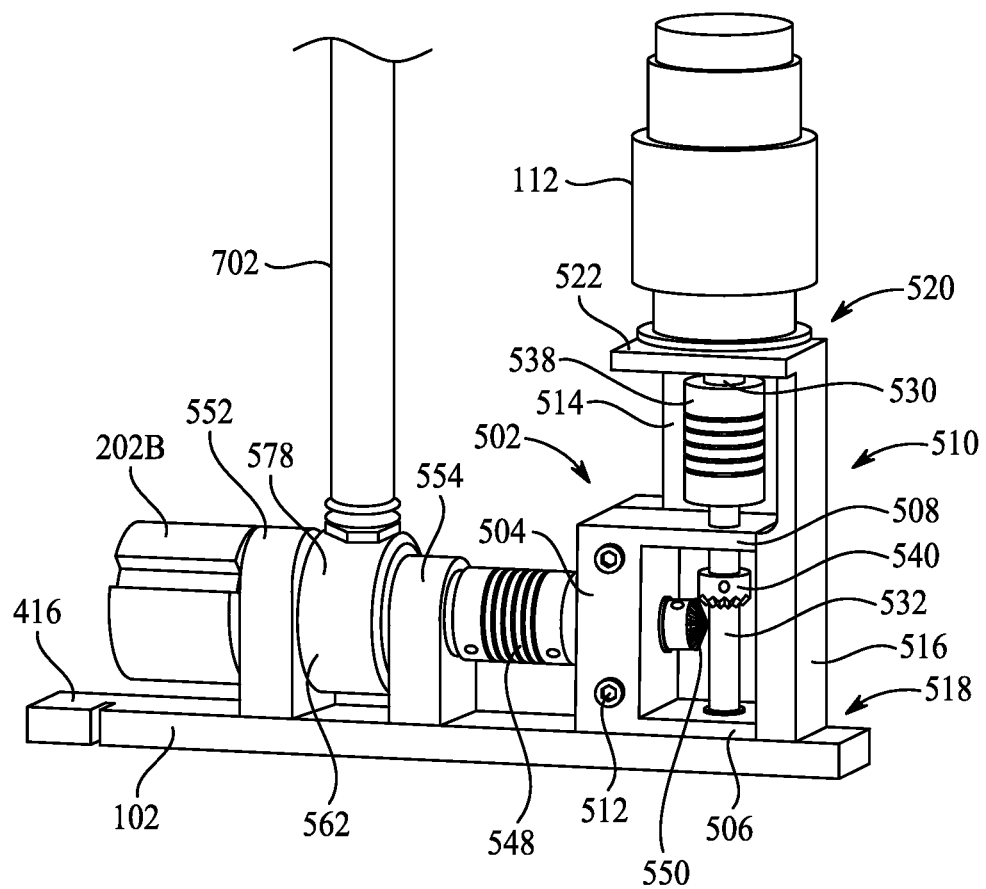
FIG. 5 is an enlarged perspective view of a gear drive arrangement showing a motor of the educational tool, according to certain embodiments.
Figure 6:
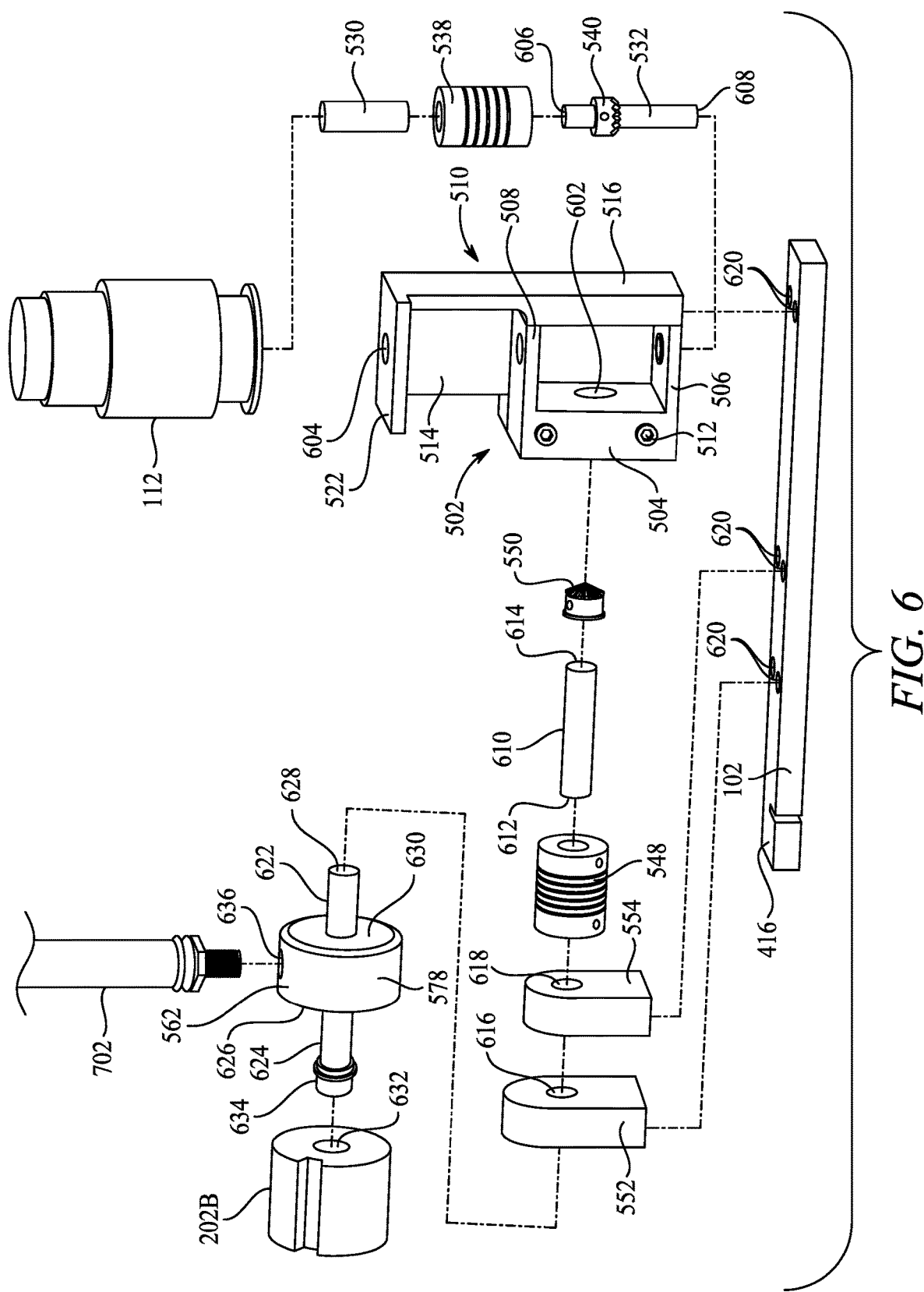
FIG. 6 is an exploded view of the gear drive arrangement of FIG. 5, according to certain embodiments.

Referring to FIG. 5, an enlarged perspective of a gear drive arrangement transmitting the drive power from the motor 112 to the rod assembly 110 is illustrated. FIG. 6 illustrates an exploded view of the gear drive arrangement of FIG. 5. Referring to FIG. 5 and FIG. 6, the educational tool 100 includes a gear housing 502 having a first wall 504 that extends perpendicularly from the top surface 416 of the swing 102. The gear housing 502 includes a lower wall 506 located on the swing 102 and an upper wall 508 disposed parallel to the lower wall 506 such that the first wall 504, the lower wall 506, and the upper wall 508 together form a C-shape. The lower wall 506 and the upper wall 508 are integrally formed with the first wall 504 of the gear housing 502 as a single part. In another aspect, the lower wall 506 and the upper wall 508 may be individual components and separately attached to the first wall 504 using fastening members.

The educational tool 100 further includes a gear frame 510 located on the top surface 416 of the swing 102 and removably attached to the first wall 504 of the gear housing 502 using fastening members 512. The gear frame 510 includes a back wall 514, and a side wall 516 extending perpendicular to the back wall 514. The back wall 514 has a lower end 518 attached to the first wall 504 of the gear housing 502 using the fastening members 512, and an upper end 520 having a platform 522 extending parallel to the swing 102. The side wall 516 extends between the platform 522 and the swing 102 such that the side wall 516 abuts the lower wall 506 and the upper wall 508 of the gear housing 502. The first wall 504 of the gear housing 502 has a first central bore 602, and the platform 522 of the gear frame 510 has a second central bore 604.

The motor 112 of the educational tool 100 is connected to the platform 522 and operatively coupled to a drive shaft 530. The drive shaft 530 extends from the motor 112 vertically downward and further extends through the second central bore 604 defined in the platform 522. In one aspect, the second central bore 604 may have a diameter greater than an outer diameter of the drive shaft 530 such that the drive shaft 530 may be freely received through the second central bore 604. In another aspect, the drive shaft 530 may be received through the second central bore 604 and rotatably supported by a bearing.

The educational tool 100 further includes a first axle 532 having a first axle end 606 and a second axle end 608. The first axle end 606 of the first axle 532 is configured to operatively connect with a first coupler 538 and the second axle end 608 of the first axle 532 is rotatably supported on the lower wall 506 of the gear housing 502. The first coupler 538 is configured to operatively couple the drive shaft 530 to the first axle end 606 of the first axle 532. The first coupler 538 is connected to the drive shaft 530 and the first axle 532 in such a way that the drive shaft 530, the first coupler 538 and the first axle 532 rotate as a single unit while transmitting the drive power from the motor 112. In another aspect, the first coupler 538 may be coupled to the drive shaft 530 and the first axle 532 using fastening members such as screws, and cotter pins. The educational tool 100 further includes a first gear 540 connected to the first axle 532 near the upper wall 508 of the gear housing 502. Particularly, a bore (not shown) is defined in the upper wall 508 of the gear housing 502 to receive the first axle 532 therethrough. In one aspect, the bore may have a diameter greater than an outer diameter of the first axle 532 such that the first axle 532 may be freely received through the bore. In another aspect, the first axle 532 may be received through the bore and rotatably supported by a bearing. The first gear 540 is disposed below the upper wall 508 of the gear housing 502 and rigidly connected to the first axle 532 such that the first axle 532 and the first gear 540 rotate as a single unit while transmitting the drive power from the motor 112.

The educational tool 100 further includes a second axle 610 having a third axle end 612 and a fourth axle end 614. The third axle end 612 extends through the first central bore 602 defined in the first wall 504 of the gear housing 502 and into a second coupler 548. The fourth axle end 614 is configured to connect to a second gear 550, which is operatively meshed with the first gear 540. The second gear 550 and the second coupler 548 are operatively connected to the second axle 610 such that the second gear 550, the second coupler 548 and the second axle 610 rotate as a single unit while transmitting the drive power from the motor 112. In one aspect, the first gear 540 is formed as a bevel gear and, correspondingly, the second gear 550 is also formed as a bevel gear, such that, when the first gear 540 and the second gear 550 are engaged each other, the drive power from the first axle 532 is transmitted to the second axle 610 at 90 degrees. In another aspect, the first gear 540 and the second gear 550 may form a worm drive arrangement, in which the first gear 540 may be formed as a worm, correspondingly, the second gear 550 may be formed as a worm wheel, or vice versa.

The educational tool 100 further includes a first mount 552 and a second mount 554 connected to the upper surface 416 of the swing 102. The first mount 552 has a fourth central bore 616, and the second mount 554 has a fifth central bore 618. The first mount 552 and the second mount 554 are connected to the swing 102 using fastening members such as screws. A pair of through holes 620 is provided in the swing 102 for each of the first mount 552 and the second mount 554 such that the fastening members are inserted from the bottom surface 418 of the swing 102 to attach the first mount 552 and the second mount 554 with the upper surface 416 thereof. In another aspect, the first mount 552 and the second mount 554 can be attached to the bottom surface 418 of the swing 102 using the fastening members.

The educational tool 100 further includes a cylindrical rod fixation 562 concentric with a cylindrical shaft 622. The cylindrical shaft 622 has a second encoder mating end 624 extending from a first side 626 of the cylindrical rod fixation 562 and a second coupler mating end 628 extending from a second side 630 of the cylindrical rod fixation 562. The second encoder mating end 624 of the cylindrical shaft 622 extends through the fourth central bore 616 of the first mount 552 and into a third central bore 632 of the second encoder 202B. A bushing 634 is operatively connected to the second encoder 202B and configured to hold the second encoder mating end 624 of the cylindrical shaft 622. The second coupler mating end 628 of the cylindrical shaft 622 extends through the fifth central bore 618 of the second mount 554 and into the second coupler 548. In one aspect, each of the fourth central bore 616 and the fifth central bore 618 of the first mount 552 and the second mount 554, respectively, may have a diameter greater than an outer diameter of the cylindrical shaft 622 such that the cylindrical shaft 622 may be freely received through the fourth central bore 616 and the fifth central bore 618. In another aspect, the cylindrical shaft 622 may be received through each of the fourth central bore 616 and the fifth central bore 618 and rotatably supported by bearings. The second coupler 548 is connected to the second coupler mating end 628 of the cylindrical shaft 622 in such a way that the cylindrical shaft 622, and the second coupler 548 rotate as a single unit while transmitting the drive power from the motor 112. In another aspect, the second coupler 548 may be coupled to the cylindrical shaft 622 using fastening members such as screws, and cotter pins. The cylindrical rod fixation 562 includes an outer surface 578 having a threaded hole 636. The cylindrical rod fixation 562 is rigidly coupled to the cylindrical shaft 622 such that the cylindrical rod fixation 562 and the cylindrical shaft 622 rotate as a single unit while transmitting the drive power from the motor 112. In one aspect, the cylindrical rod fixation 562 may be rigidly coupled to the cylindrical shaft 622 using a keyway. In another aspect, the cylindrical rod fixation 562 may be rigidly coupled to the cylindrical shaft 622 using fastening members, such as screws, inserted from the outer surface 578 of the cylindrical rod fixation 562 to connect with the cylindrical shaft 622.

Figure 7:
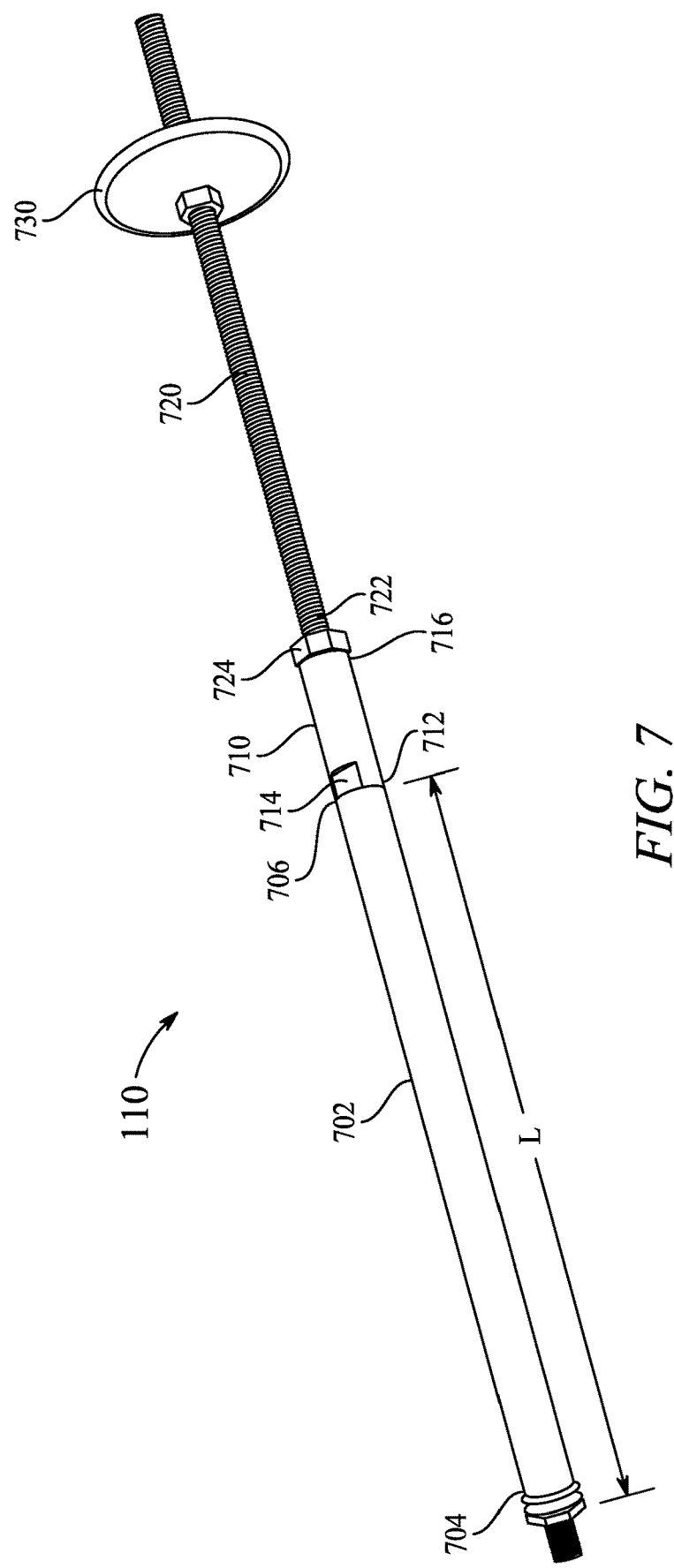
FIG. 7 is a perspective view of a rod assembly of the educational tool, according to certain embodiments.

Referring to FIG. 7, a perspective view of the rod assembly 110 of the educational tool 100 is illustrated. The rod assembly 110 of the educational tool 100 includes a rod 702 having a threaded end 704 and an extender end 706. The rod 702 has a rod length 1' defined between the threaded end 704 and the extender end 706. The threaded end 704 is configured to screw into the threaded hole 636 of the cylindrical rod fixation 562. In another aspect, the rod 702 may be detachably attached to the cylindrical rod fixation 562 using a snap fit mechanism, a press fit mechanism, or any other mechanisms known in the art. The rod assembly 110 further includes a rod extender 710 having a tapered end 712 configured to press fit into the extender end 706 of the rod 702. In an aspect, the tapered end 712 of the rod extender 710 may have a rod (not shown) threadably engaged with the extender end 706 of the rod 702 such that the rod extender 710 and the rod 702 may be telescopically coupled to each other. Such telescopic arrangement may help to increase overall length of the rod assembly 110 based on the experimental requirements. A pair of parallel flat surfaces 714 is defined at the tapered end 712 of the rod extender 710 such that tools such as wrenches may be used to extend the overall length of the rod assembly 110. In an aspect, the rod 702 and the rod extender 710 may together define the rod length 'L'. The rod assembly 110 further includes a thread bar 720 having a rod extender end 722 configured to screw into a threaded cavity end 716 of the rod extender 710. The thread bar 720 is rigidly coupled to the rod extender 710 using fastening members such as a nut 724. The rod assembly 110 further includes a disc shaped mass 730 having a threaded central bore 732 (shown in FIG. 9). The thread bar 720 is configured to engage with the threaded central bore 732 to position the disc shaped mass 730. The thread bar 720 includes position markings (not shown) to provide visual indication to the user about the position of the disc shaped mass 730 on the thread bar 720. In one aspect, the position markings may be debossed on the thread bar 720. In another aspect, the position markings may be provided as color marks or signs.

Figure 8:
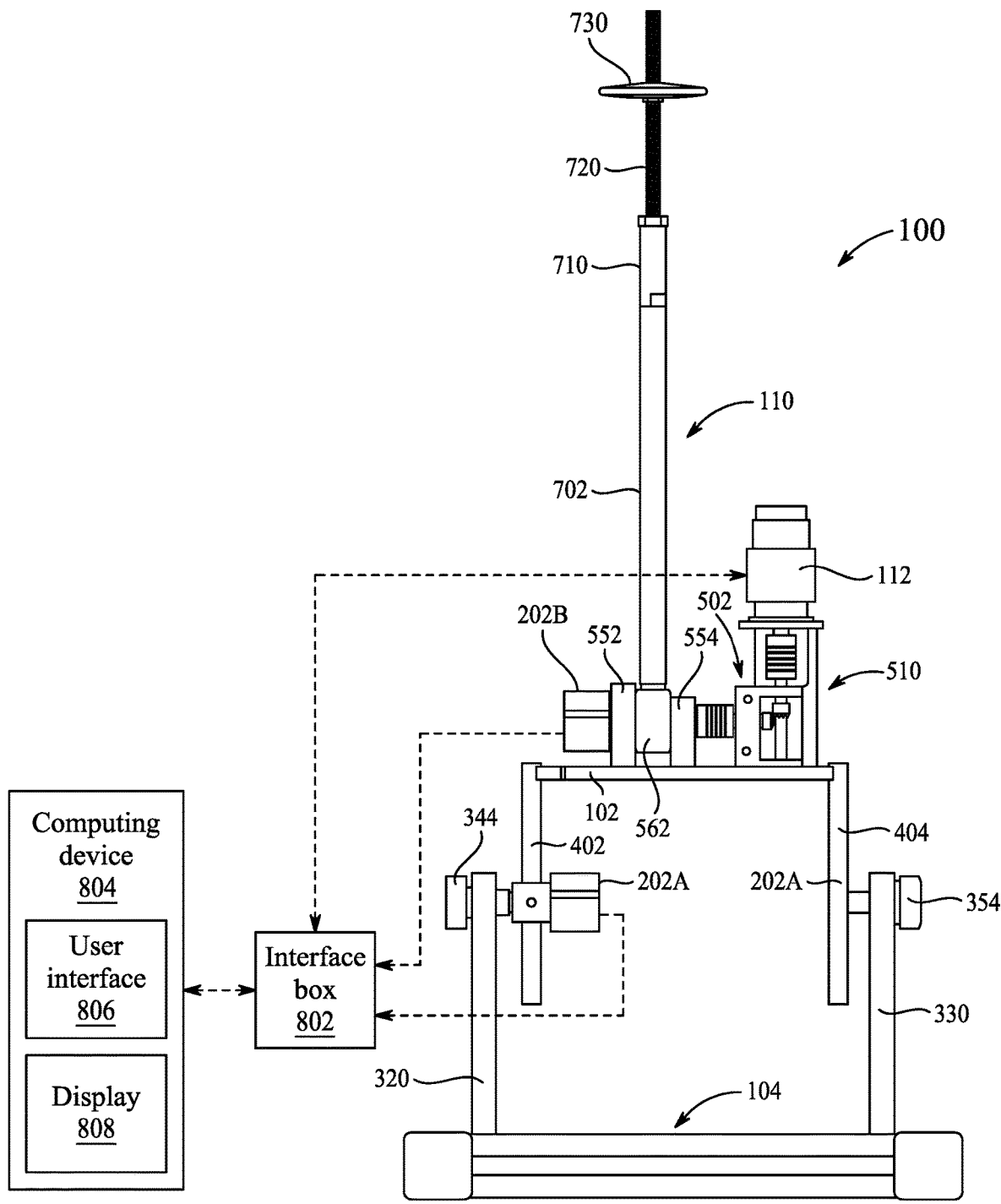
FIG. 8 is a schematic diagram illustrating a computing system associated with the educational tool, according to certain embodiments.

Referring to FIG. 8, a schematic diagram showing communication of the first and the second encoders 202A, 202B and the motor 112 with an interface box 802 and a computing device 804 is illustrated. Referring to FIG. 1 to FIG. 8, the educational tool 100 includes the interface box 802 that is operatively connected to the motor 112 and the at least one encoder 202. Particularly, the interface box 802 is operatively connected to the first encoder 202A and the second encoder 202B to receive the signals indicative of the positions of the swing 102 and the rod assembly 110, respectively. In an aspect, the first encoder 202A and the second encoder 202B are connected by one of a wireless connection and a wired connection to the interface box 802. The educational tool 100 further includes the computing device 804 operatively connected to the interface box 802.

The computing device 804 includes a user interface 806 and a display 808. The user interface 806 is configured to receive user inputs. The user inputs include predefined parameters indicative of dimensional specifications of the swing 102, the rod assembly 110, the motor 112, the stand 104, and the gear drive arrangement including the first gear 540 and the second gear 550. Particularly, the user inputs include a weight of the disc shaped mass 730, a height of one of the adjustment holes 406 or 408 from the stand 104, a first identification code of the first encoder 202A, a second identification code of the second encoder 202B, the position marking of a location of the disc shaped mass 730, a length of the rod 702, a motor control signal amplitude, and a motor control signal frequency. The motor control signal amplitude may be defined as a value of electric power ratings, such as voltage and current, supplied to the motor 112. The amplitude of the motor control signals may be varied to supply required power to the motor 112 to transmit the drive power therefrom as the power rating varies based on the length of the rod 702, the location of the disc shaped mass 730 on the thread bar 720, and the weight of the disc shaped mass 730. In an aspect of the present disclosure, the disc shaped mass 730 may be one of a solid mass, a shaped mass, an enclosure having a partial filling which can move within the enclosure as the disc shaped mass is moved. The partial filling may be round pellets of heavy material, such as iron or carbon steel. A specification of the disc shaped mass may include a type of disc shaped mass.

The motor control signal frequency may be defined as the frequency at which the motor control signals may be sent to the motor 112. The frequency may be further defined as a predefined time interval at which the control signals can be sent to the motor 112 to transmit the drive power therefrom to rotate the rod assembly 110 with respect to the swing 102 to make the swing 102 to take the stable pose. Such predefined parameters are inputted to the computing device 804 via the user interface 806 before initiating the center of gravity based experiments. Various forms of the user interface 806 are described in detail with respect to FIG. 12 and FIG. 13. The computing device 804 further includes the display 808 that is configured to provide an indication of a stability of a pose of the swing 102.

Figure 9:
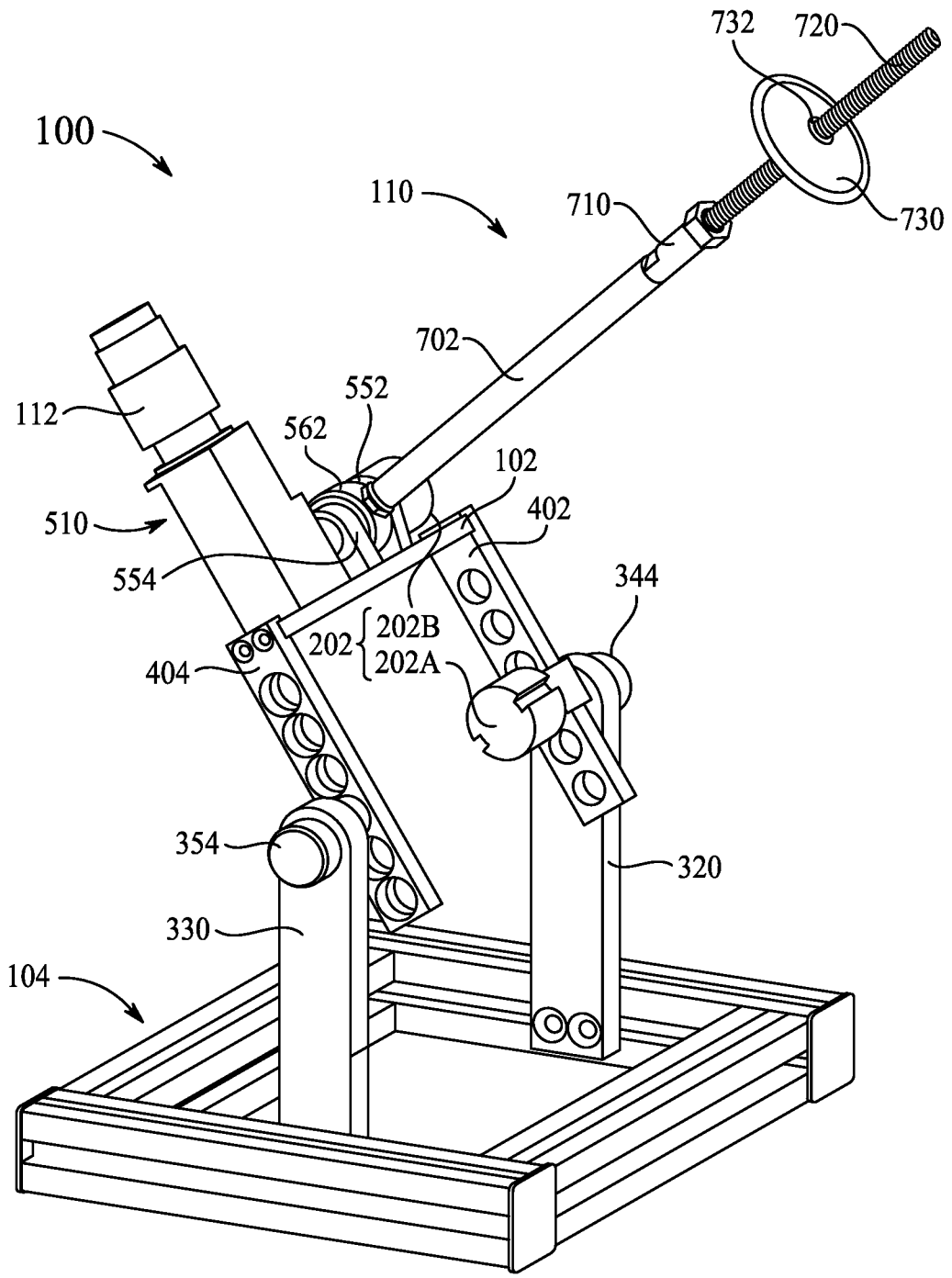
FIG. 9 is a perspective view of the educational tool showing a stable pose of the swing, according to certain embodiments.

Referring to FIG. 9, a perspective view of the educational tool 100 showing the stable pose of the swing 102 is illustrated. Referring to FIG. 1 to FIG. 9, the computing device 804 includes circuitry and program instructions, which when executed by one or more processors, are configured to receive the position signals from the interface box 802. In one aspect, the interface box 802 may have the capability to determine a value of the angular positions of the swing 102 and the rod assembly 110 based on the position signals received from the first encoder 202A and the second encoder 202B, respectively. The value of the angular positions of the swing 102 and the rod assembly 110 is further communicated with the computing device 804. In another aspect, the interface box 802 may communicate the position signals from the first encoder 202A and the second encoder 202B with the computing device 804 such that the computing device 804 may determine the value of the angular positions of the swing 102 and the rod assembly 110, respectively. The computing device 804 further analyzes the position signals to determine the center of gravity of the swing 102 and the rod assembly 110. The computing device 804 processes the position signals received from the first encoder 202A to determine the center of gravity of the swing 102 and processes the position signals received from the second encoder 202B to determine the center of gravity of the rod assembly 110. Based on the determined center of gravity of the swing 102 and the rod assembly 110, the computing device 804 generate motor control signals to adjust position of the swing 102 and the rod assembly 110 to the stable pose. The computing device 804 is configured to generate the motor control signals in such a way to move the center of gravity of each of the swing 102 and the rod assembly 110 in the same plane to achieve the stable pose. Particularly, when the swing 102 moves in a clockwise direction, the computing device 804 may generate the motor control signals to move the rod assembly 110 in an anti-clockwise direction such that the center of gravity of each of the swing 102 and the rod assembly 110 may fall in the same plane to achieve the stable pose for the swing 102. The interface box 802 is communicated with the computing device 804 in such a way that the position signals from the first encoder 202A and the second encoder 202B are communicated from the interface box 802 to the computing device 804 and the motor control signals is communicated from the computing device 804 to the interface box 802, and the motor control signals is further communicated to the motor 112 by the interface box 802.

Figure 10:
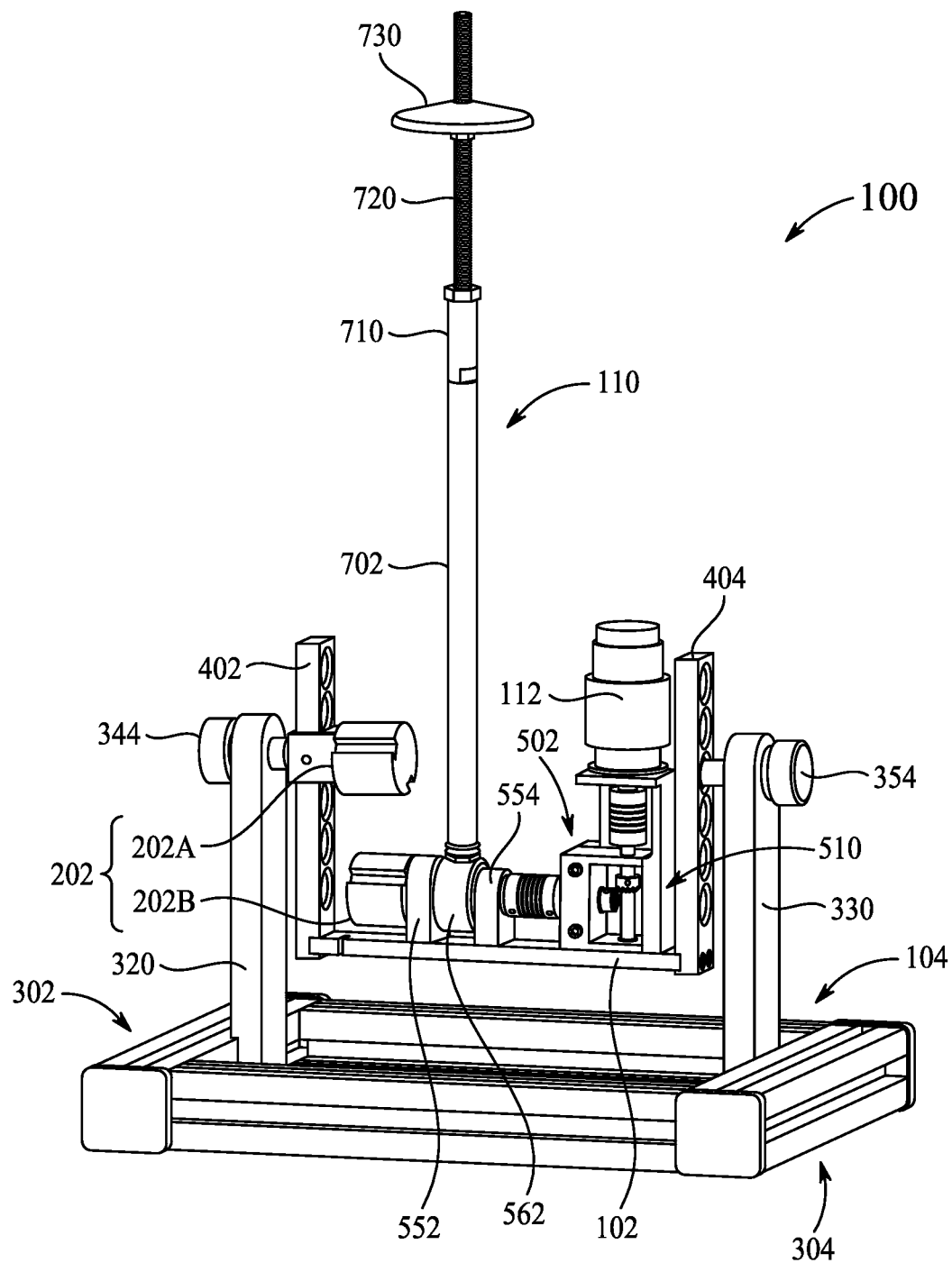
FIG. 10 is a perspective view of a second configuration of the educational tool, according to certain embodiments.

Referring to FIG. 10, a perspective view of the second configuration of the educational tool 100 is illustrated. The educational tool 100 is used for testing and demonstrating center of gravity based control in research labs. The educational tool 100 includes the swing 102 that is supported by the stand 104 on the floor or the planar surface. The swing 102 is operatively and rotatably supported on the stand 104. The educational tool 100 further includes the rod assembly 110 operatively connected to the swing 102, and the motor 112 supported on the swing 102 and operatively connected to the rod assembly 110. The swing 102, the rod assembly 110, and the motor 112 together constitute essential elements of the educational tool 100. The educational tool 100 is used to test and demonstrate the center of gravity based control using the swing 102, the rod assembly 110 and the motor 112. The motor 112 provides the drive power to rotate the rod assembly 110 with respect to the swing 102 to make the swing 102 take a stable pose based on an angular position of the rod assembly 110.

In the second configuration of the educational tool 100, the swing 102 and the rod assembly 110 are supported on the stand 104 in a U-shape. The first configuration of the educational tool 100 is easily switched to the second configuration of the educational tool 100. In one aspect, an orientation of the swing 102 along with the rod assembly 110 and the motor 112 is changed to upside down to switch the first configuration of the education tool 100 to the second configuration. Particularly, in the first configuration, the first swing end 412 and the second swing end 414 of the swing 102 are attached to the first adjustable strut 402 and the second adjustable strut 404 such that the rod assembly 110 and the motor 112 are mounted on the top surface 416 of the swing 102. The first swing end 412 and the second swing end 414 of the swing 102 are detachably coupled to the first adjustable strut 402 and the second adjustable strut 404 using the fasteners 430. In the second configuration, the swing 102 along with the rod assembly 110 and the motor 112 is detached from the first adjustable strut 402 and the second adjustable strut 404 and changed the orientation of the swing 102 to upside down and reattached to the first adjustable strut 402 and the second adjustable strut 404 using the fasteners 430. In another aspect, the orientation of the swing 102 in the second configuration of the educational tool 100 is remain same as the first configuration. However, the rod assembly 110 and the motor 112 are attached to the bottom surface 418 of the swing 102 in the second configuration of the educational tool 100, whereas the rod assembly 110 and the motor 112 are attached to the top surface 416 of the swing 102 in the first configuration of the educational tool 100.

In various aspects of the present disclosure, the dynamics of the education tool 110 can be changed by one of or combinations of (i) changing the height of the swing 102 with respect to the base 409 of the stand 104, which is achieved by the plurality of the first adjustment holes 406 of the first adjustable strut 402 and the plurality of the second adjustment holes 408 of the second adjustable strut 404, (ii) using the rod 702 of different sizes and lengths, (iii) using different disc shaped masses 730, (iv) positioning the disc shaped mass 730 at different heights on the thread bar 720, and (v) using a mass having freely movable small metallic balls to make the control design more challenging. Thus, with the educational tool 110 of the present disclosure, different physical systems can be realized by using the first and second configurations and by changing the dynamics of the educational tool 100. The educational tool 110 of the present disclosure is nonlinear and underactuated as it has a lower number of actuators, namely one actuator, compared to the degrees of freedom, and thus makes the control design problem more challenging.

Figure 11:
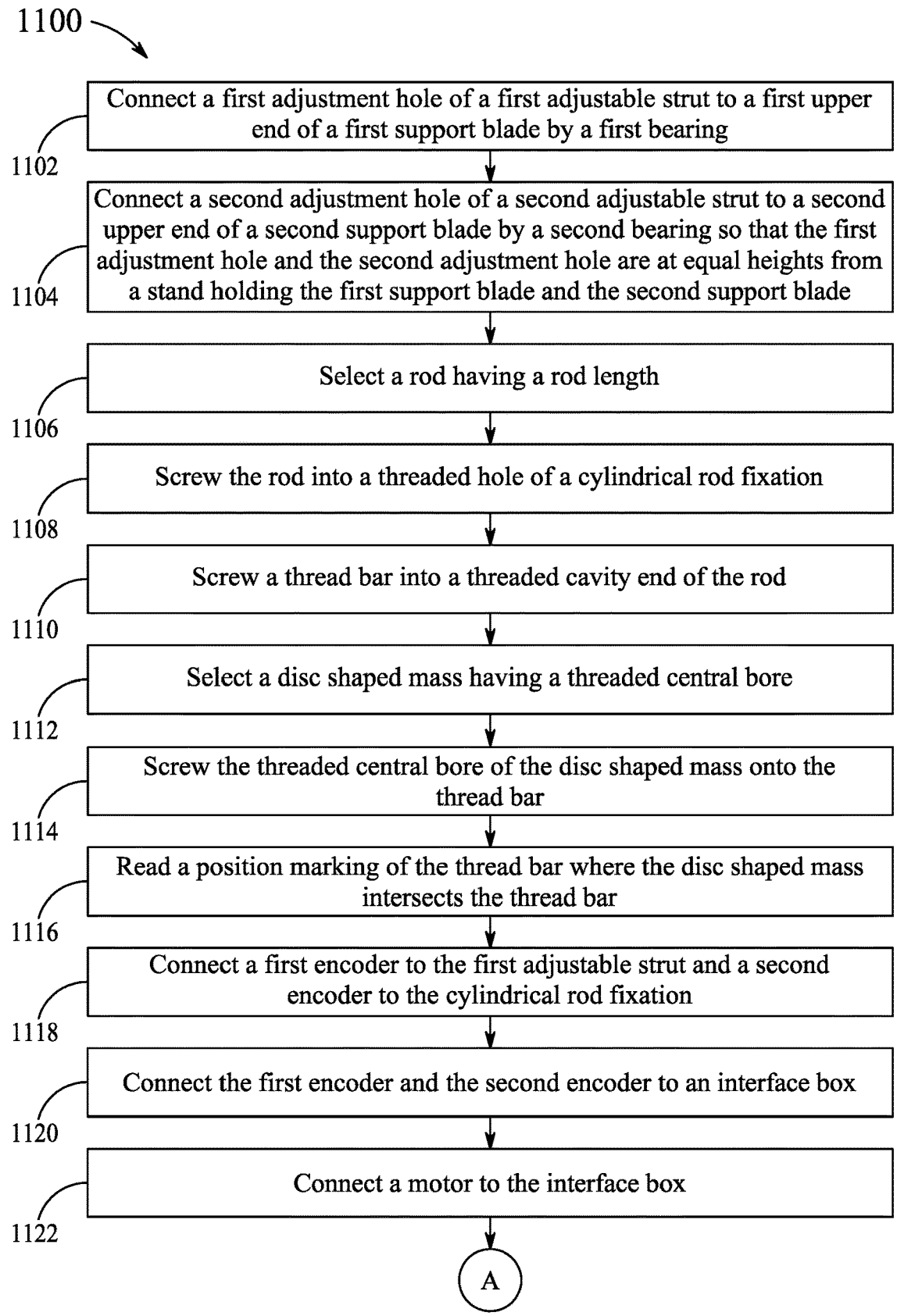
FIG. 11 is an exemplary flowchart of a method for testing and demonstrating center of gravity based control using the educational tool, according to certain embodiments.
Figure 11:
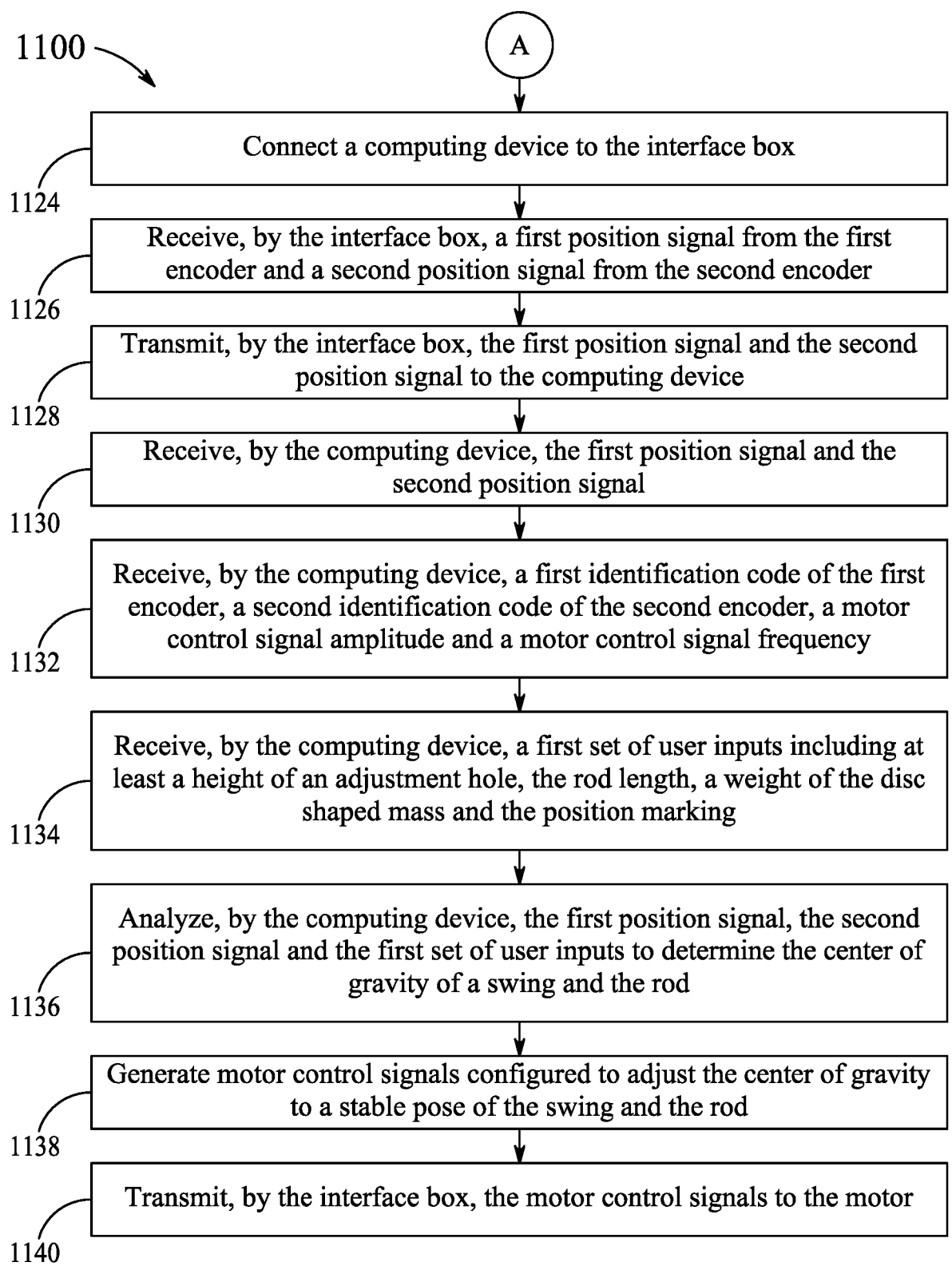

Referring to FIG. 11, an exemplary flowchart of a method 1100 for testing and demonstrating center of gravity based control using the educational tool 100 is illustrated. The method 1100 is described with reference to the first configuration of the educational tool 100 illustrated in FIG. 1 through FIG. 9. The method 1100 may also be implemented with reference to the second configuration of the educational tool 100 illustrated in FIG. 10.

At step 1102, the method 1100 includes connecting the first adjustment hole 406 of the first adjustable strut 402 to the first upper end 324 of the first support blade 320 by the first bearing 346. During an assembly of the educational tool 100, the first threaded axle 342 is inserted through the first though hole 340. Further, the first knob 344 is threadably engaged with the first end of the first threaded axle 342 and the first bearing 346 is engaged with the second end of the first threaded axle 342. The bushing 348 is also attached to the second end of the threaded axle 342 to attach the first encoder 202A. Similarly, the second threaded axle 352 is inserted through the second though hole 350. Further, the second knob 354 is threadably engaged with the first end of the second threaded axle 352 and the second bearing 356 is engaged with the second end of the second threaded axle 352.

At step 1104, the method 1100 includes connecting the second adjustment hole 408 of the second adjustable strut 404 to the second upper end 334 of the second support blade 330 by the second bearing 356 so that the first adjustment hole 406 and the second adjustment hole 408 are at equal heights from the stand 104 holding the first support blade 320 and the second support blade 330. Upon the assembly of the first bearing 346 and the second bearing 356 on the first support blade 320 and the second support blade 330, the first adjustable strut 402 and the second adjustable strut 404 are rotatably supported on the first support blade 320 and the second support blade 330, respectively.

At step 1106, the method 1100 includes selecting the rod 702 having the rod length In an aspect, the rod length 1' is defined as an overall length of the rod 702 and the rod extender 710, as such the rod extender 710 may be moved linearly with respect to the rod 702 to adjust the rod length 1' based on the experimental requirements.

At step 1108, the method 1100 includes screwing the rod 702 into the threaded hole 636 of the cylindrical rod fixation 562. Upon adjusting the rod length 1' of the rod 702, the threaded end 704 of the rod 702 is screwed into the threaded hole 636 of the cylindrical rod fixation 562. Fastening members such as nuts and washers are used to rigidly couple the rod 702 with the cylindrical rod fixation 562.

At step 1110, the method 1100 includes screwing the thread bar 720 into the threaded cavity end 716 of the rod 702. In an aspect, the rod 702 and the rod extender 710 together may be defined as 'the rod', in such a case, the rod includes the threaded cavity 716 to couple with the rod extender end 722 of the thread bar 720. Further, the thread bar 720 is rigidly coupled to the rod using fastening members such as the nut 724.

At step 1112, the method 1100 includes selecting the disc shaped mass 730 having the threaded central bore 732. In an aspect, multiple rods of different lengths and sizes can be used for the experiments, and the resulting center of gravity can be adjusted using different masses and positioning the masses at different heights on the thread bar 720. Moreover, multiple types of masses can be used, and the disc shaped mass 730 is one example according to the present disclosure. In another example, a mass having freely movable small metallic balls can be used to make the control design more challenging.

At step 1114, the method 1100 includes screwing the threaded central bore 732 of the disc shaped mass 730 onto the thread bar 720. The disc shaped mass 730 is further attached to the thread bar 720 with the help of fastening members such as nuts such that the disc shaped mass 730 is rigidly positioned on the thread bar 720.

At step 1116, the method 1100 includes reading the position marking of the thread bar 720 where the disc shaped mass 730 intersects the thread bar 720. Upon the disc shaped mass 730 is positioned on the thread bar 720, the position marking may be recorded by the user. In an aspect, the position marking may be recorded as a numerical value or a position indicator in the form of a color code or a sign.

At step 1118, the method 1100 includes connecting the first encoder 202A to the first adjustable strut 402 and the second encoder 202B to the cylindrical rod fixation 562. Upon operatively connecting the swing 102 and the rod assembly 110 on the stand 104, the first encoder 202A is operatively supported on the busing 348 and connected to the first adjustable strut 402 using the bracket 410. The second encoder 202B is operatively coupled to second encoder mating end 624 of the cylindrical shaft 622 using the bushing 634 and rigidly coupled to the first mount 552. In an aspect, the second encoder 220B can be coupled to the cylindrical rod fixation 562 of the rod assembly 110.

At step 1120, the method 1100 includes connecting the first encoder 202A and the second encoder 2020B to the interface box 802. The first encoder 202A and the second encoder 202B are connected by one of the wireless connection and the wired connection to the interface box 802. The first encoder 202A generates the first position signal based on the position of the swing 102 and the second encoder 202B generates the second position signal based on the position of the rod assembly 110.

At step 1122, the method 1100 includes connecting the motor 112 to the interface box 802. The motor 112 is connected by the wired connection to the interface box 802.

At step 1124, the method 1100 includes connecting the computing device 804 to the interface box 802. In an aspect, the computing device 804 is connected by one of the wireless connection and the wired connection to the interface box 802. In another aspect, the computing device 804 may constitute the interface 802, in such a case, the computing device 804 may communicate with the first encoder 202A, the second encoder 202B, and the motor 112.

At step 1126, the method 1100 includes receiving, by the interface box 802, the first position signal from the first encoder 202A and the second position signal from the second encoder 202B.

At step 1128, the method 1100 includes transmitting, by the interface box 802, the first position signal and the second position signal to the computing device 804.

At step 1130, the method 1100 includes receiving, by the computing device 804, the first position signal and the second position signal.

At step 1132, the method 1100 includes receiving, by the computing device 804, the first identification code of the first encoder 202A, the second identification code of the second encoder 202B, the motor control signal amplitude and the motor control signal frequency.

At step 1134, the method 1100 includes receiving, by the computing device 804, a first set of user inputs including at least the height of the adjustment hole 406 or 408, the rod length the weight of the disc shaped mass 730 and the position marking. The first set of user inputs may be inputted to the computing device 804 before the start of the experiment and the education tool 100 is fully assembled.

At step 1136, the method 1100 includes analyzing, by the computing device 804, the first position signal, the second position signal and the first set of user inputs to determine the center of gravity of the swing 102 and the rod 702.

At step 1138, the method 1100 includes generating the motor control signals configured to adjust the center of gravity to the stable pose of the swing 102 and the rod 702. The method 1100 further includes inputting, at the user interface 806, programming instructions. Particularly, the computing device 804 that includes circuitry and one or more processors receives the programming instructions. The one or more processors executes the programming instructions to determine the center of gravity of the swing 102 and the rod 702. The computing device 804 further generates the motor control signals which adjust the center of gravity of the swing 102 and the rod 702 to the stable pose.

At step 1140, the method 1100 includes transmitting, by the interface box 802, the motor control signals to the motor 112. The motor control signals actuate the motor 112 to rotate the drive shaft 530 to turn the first gear 540. As the first gear 540 and the second gear 550 are meshed to each other, the first gear 540 turns the second gear 550 connected to an axle, otherwise referred to as the second axle 610, as the first gear 540 turns. The second gear 550 further rotates the second axle 610. The second axle 610 rotates the cylindrical shaft 622 of the cylindrical rod fixation 562. As the drive power from the motor 112 is transmitted to the cylindrical shaft 622, the first encoder 202A records the first position signals of the first adjustable strut 402 and the second encoder 202B records the second position signals of the cylindrical shaft 622. The first and the second position signals are then transmitted to the interface box 802.

The method 1100 further includes assigning a first stability metric to the stable pose of the swing 102 and the rod 702. In an aspect, the first stability metric may include a first reading indicative of the position of the swing 102 and the rod 702. The first reading indicative of the position of the swing 102 and the rod 702 is captured by the first encoder 202A and the second encoder 202B, respectively. Based on the first user inputs and the first stability metric, the computing device 804 may send the motor control signals to the motor 112 to rotate the rod 702 with respect to the swing 102 to make the swing 102 to take the stable pose, otherwise referred to as 'the first pose'. The method 1100 further includes receiving a second set of user inputs. The second user inputs include a weight of the disc shaped mass 730, a height of one of the adjustment holes from the stand 104, a first identification code of the first encoder 202A, a second identification code of the second encoder 202B, the position marking of a location of the disc shaped mass 730, a length of the rod 702, a motor control signal amplitude and a motor control signal frequency, which are different from the first user inputs. The display 808 of the computing device 804 displays a second pose of the swing 102 and the rod 702 based on the second set of user inputs. The computing device 804 determines a second stability metric of the second pose. The second stability metric may include a second reading indicative of the position of the swing 102 and the rod 702 which are captured by the first encoder 202A and the second encoder 202B, respectively. Based on the second user inputs and the second stability metric, the computing device 804 may send the motor control signals to the motor 112 to rotate the rod 702 with respect to the swing 102 to make the swing 102 to take the second pose.

The computing device 804 further compares the second stability metric to the first stability metric. When the second stability metric is not equal to the first stability metric, the display 808 displays a notification that the second set of user inputs do not yield a stable configuration and a prompt to enter a third set of user inputs. The method 1100 further includes receiving the third set of user inputs by the computing device 804. The third set of user inputs include a weight of the disc shaped mass 730, a height of one of the adjustment holes from the stand 104, a first identification code of the first encoder 202A, a second identification code of the second encoder 202B, the position marking of a location of the disc shaped mass 730, a length of the rod 702, a motor control signal amplitude and a motor control signal frequency, which are different from the first user inputs and the second user inputs. The display 808 displays a third pose of the swing 102 and the rod 702. The computing device 804 further determines a third stability metric of the third pose. The third stability metric may include a third reading indicative of the position of the swing 102 and the rod 702 which are captured by the first encoder 202A and the second encoder 202B, respectively. Based on the third set of user inputs and the third stability metric, the computing device 804 may send the motor control signals to the motor 112 to rotate the rod 702 with respect to the swing 102 to make the swing 102 to take the third pose.

The computing device 804 further compares the third stability metric to the first stability metric. When the third stability metric is not equal to the first stability metric, the computing device 804 compares the third stability metric to the second stability metric. The computing device 804 further determines a relative stability between the second pose and the third pose, and displays the first pose, the second pose and the third pose on the display 808 with their respective stability metrics and user inputs.

The first embodiment of the present disclosure is illustrated with respect to FIG. 1 through FIG. 10. The first embodiment describes the educational tool 100 for testing and demonstrating center of gravity based control. The education tool 100 comprising the swing 102 having the first swing end 412 and the second swing end 414; the rod assembly 110 operatively connected to the swing 102; the motor 112 operatively connected to the rod assembly 110; the at least one encoder 202 configured to generate position signals; the interface box 802 operatively connected to the motor 112 and the at least one encoder 202; and the computing device 804 operatively connected to the interface box 802. The computing device 804 includes circuitry and program instructions, which when executed by one or more processors, are configured to receive the position signals from the interface box 802, analyze the position signals to determine the center of gravity of the swing 102 and the rod assembly 110, and generate motor control signals configured to adjust the swing 102 and the rod assembly 110 to the stable pose. The interface box 802 is configured to transmit the motor control signals to the motor 112 and transmit the position signals from the at least one encoder 202 to the computing device 804.

The educational tool 100 further comprising the stand 104 having the first stand end 302 and the second stand end 304; the first support blade 320 having the first lower end 322 and the first upper end 324, the first lower end 322 perpendicularly attached to the first stand end 302; and the second support blade 330 having the second lower end 332 and the second upper end 334, the second lower end 332 perpendicularly attached to the second stand end 304, wherein the second support blade 330 is parallel to and extends in the same direction as the first support blade 320.

The educational tool 100 further comprising the first adjustable strut 402 attached to the first upper end 324 of the first support blade 320 by the first bearing 346; the second adjustable strut 404 attached to the second upper end 334 of the second support blade 330 by the second bearing 356; and the first encoder 202A attached to the first adjustable strut 402 by the bracket 410.

The first encoder 202A is connected by one of the wireless connection and the wired connection to the interface box 802.

The first adjustable strut 402 and the second adjustable strut 404 each have a plurality of adjustment holes, wherein the first adjustment hole 406 of the first adjustable strut 402 is configured to receive the first bearing 346 and the second adjustment hole 408 of the second adjustable strut 404 is configured to receive the second bearing 356, wherein the first adjustment hole 406 and the second adjustment hole 408 are at equal heights from the base 409 of the stand 104; the first adjustable strut 402 has the first upper strut end 422 having the first slot 424 configured to receive the first swing end 412; and the second adjustable strut 404 has the second upper strut end 426 having the second slot 428 configured to receive the second swing end 414.

The educational tool 100 further comprising the gear housing 502 having the first wall 504 which extends perpendicularly from the swing 102, the first wall 504 having the first central bore 602, the lower wall 506 connected to the swing 102, and the upper wall 508 parallel to the lower wall 506, wherein the first wall 504, the lower wall 506 and the upper wall 508 form the C-shape; the gear frame 510 having the back wall 514, the lower end 518 of the back wall 514 attached to the first wall 504, the upper end 520 of the back wall 514 having the platform 522 extending parallel to the swing 102, the platform 522 having the second central bore 604; and the side wall 516 perpendicular to the back wall 514, the side wall 516 extending between the platform 522 and the swing 102; the drive shaft 530 extending from the motor 112, wherein the motor 112 is connected to the platform 522 so that the drive shaft 530 extends through the second central bore 604; the first axle 532 having the first axle end 606 and the second axle end 608; the first coupler 538 configured to operatively connect the drive shaft 530 to the first axle end 606; and the first gear 540 connected to the first axle 532 near the upper wall 508 of the gear housing 502, the second axle end 608 connected to the lower wall 506 of the gear housing 502.

The educational tool 100 further comprising the second encoder 202B having the third central bore 632; the second coupler 548; the first mount 552 connected to the swing 102, the first mount 552 having the fourth central bore 616; the second mount 554 connected to the swing 102, the second mount 554 having the fifth central bore 618; the cylindrical rod fixation 562 concentric with the cylindrical shaft 622, the cylindrical shaft 622 having the second encoder mating end 624 extending from the first side 626 of the cylindrical rod fixation 562 and the second coupler mating end 628 extending from the second side 630 of the cylindrical rod fixation 562, the cylindrical rod fixation 562 including the outer surface 578 having the threaded hole 636, wherein the second encoder mating end 624 of the cylindrical shaft 622 extends through the fourth central bore 616 of the first mount 552 and into the third central bore 632 of the second encoder 202B; and the bushing 634 operatively connected to the second encoder 202B, the bushing 634 configured to hold the second encoder mating end 624 of the cylindrical shaft 622, wherein the second coupler mating end 628 of the cylindrical shaft 622 extends through the fifth central bore 618 of the second mount 554 and into the second coupler 548.

The educational tool 100 further comprising the second axle 610 having the third axle end 612 and the fourth axle end 614, the third axle end 612 extending through the first central bore 602 and into the second coupler 548; and the second gear 550 connected to the fourth axle end 614, wherein the second gear 550 is operatively meshed with the first gear 540.

The educational tool 100 further comprising the rod assembly 110 including the rod 702 having the threaded end 704 and the extender end 706, wherein the threaded end 704 is configured to screw into the threaded hole 636 of the cylindrical rod fixation 562; the rod extender 710 having the tapered end 712 configured to press fit into the extender end 706 of the rod 702 and the threaded cavity end 716; the thread bar 720 having the rod extender end 722 configured to screw into the threaded cavity end 716, the thread bar 720 including position markings; and the disc shaped mass 730 having the threaded central bore 732, wherein the thread bar 720 is configured to engage with the threaded central bore 732 to position the disc shaped mass 730.

The computing device 804 includes the user interface 806 and the display 808. The user interface 806 is configured to receive user inputs, wherein the user inputs include the weight of the disc shaped mass 730, the height of one of the adjustment holes 406 or 408 from the stand 104, the first identification code of the first encoder 202A, the second identification code of the second encoder 202B, the position marking of the location of the disc shaped mass 730, the length of the rod 702, the motor control signal amplitude and the motor control signal frequency. The display 808 is configured to provide the indication of the stability of the pose of the swing 102.

The second embodiment of the present disclosure is illustrated with respect to FIG. 1 through FIG. 11. The second embodiment describes the method 1100 for testing and demonstrating center of gravity based control by the educational tool 100. The method 1100 comprising connecting the first adjustment hole 406 of the first adjustable strut 402 to the first upper end 324 of the first support blade 320 by the first bearing 346; connecting the second adjustment hole 408 of the second adjustable strut 404 to the second upper end 334 of the second support blade 330 by the second bearing 356 so that the first adjustment hole 406 and the second adjustment hole 408 are at equal heights from the stand 104 holding the first support blade 320 and the second support blade 330; selecting the rod 702 having the rod length screwing the rod 702 into the threaded hole 636 of the cylindrical rod fixation 562; screwing the thread bar 720 into the threaded cavity end 716 of the rod 702; selecting the disc shaped mass 730 having the threaded central bore 732; screwing the threaded central bore 732 of the disc shaped mass 730 onto the thread bar 720; reading the position marking of the thread bar 720 where the disc shaped mass 730 intersects the thread bar 720; connecting the first encoder 202A to the first adjustable strut 402 and the second encoder 202B to the cylindrical rod fixation 562; connecting the first encoder 202A and the second encoder 202B to the interface box 802; connecting the motor 112 to the interface box 802; connecting the computing device 804 to the interface box 802; receiving, by the interface box 802, the first position signal from the first encoder 202A and the second position signal from the second encoder 202B; transmitting, by the interface box 802, the first position signal and the second position signal to the computing device 804; receiving, by the computing device 804, the first position signal and the second position signal; receiving, by the computing device 804, the first identification code of the first encoder 202A, the second identification code of the second encoder 202B, the motor control signal amplitude and the motor control signal frequency; receiving, by the computing device 804, the first set of user inputs including at least the height of the adjustment hole 406 or 408, the rod length the weight of the disc shaped mass 730 and the position marking; analyzing, by the computing device 804, the first position signal, the second position signal and the first set of user inputs to determine the center of gravity of the swing 102 and the rod 702; generating motor control signals configured to adjust the center of gravity to the stable pose of the swing 102 and the rod 702; and transmitting, by the interface box 802, the motor control signals to the motor 112.

The method 1100 further comprising inputting, at the user interface 806, programming instructions; receiving, by the computing device 804 which includes circuitry and one or more processors, the programming instructions; executing, by the one or more processors, the programming instructions to determine the center of gravity of the swing 102 and the rod 702; and generating, by the computing device 804, the motor control signals which adjust the center of gravity of the swing 102 and the rod 702 to the stable pose.

The method 1100 further comprising assigning the first stability metric to the stable pose of the swing 102 and the rod 702; receiving the second set of user inputs; displaying, on the display 808 of the computing device 804, the second pose of the swing 102 and the rod 702 based on the second set of user inputs; determining, by the computing device 804, the second stability metric of the second pose; comparing the second stability metric to the first stability metric; when the second stability metric is not equal to the first stability metric, displaying the notification on the display 808 that the second set of user inputs do not yield the stable configuration and the prompt to enter the third set of user inputs; receiving the third set of user inputs; displaying, on the display 808, the third pose of the swing 102 and the rod 702; determining, by the computing device 804, the third stability metric of the third pose; comparing the third stability metric to the first stability metric; when the third stability metric is not equal to the first stability metric, comparing the third stability metric to the second stability metric; determining the relative stability between the second pose and the third pose; and displaying the first pose, the second pose, and the third pose on the display 808 with their respective stability metrics and user inputs.

The method 1100 further comprising actuating, by the motor control signals, the motor 112 to rotate the drive shaft 530 to turn the first gear 540; turning, by the first gear 540, the second gear 550 meshed with the first gear 540 and connected to the axle 610; rotating the axle 610 by the second gear 550; rotating, by the axle 550, the cylindrical shaft 622 of the cylindrical rod fixation 562; recording, by the first encoder 202A, the first position signals of the first adjustable strut 402; recording, by the second encoder 202B, the second position signals of the cylindrical shaft 622; and transmitting the first and second position signals to the interface box 802.

The third embodiment of the present disclosure is illustrated with respect to FIG. 1 through FIG. 10. The third embodiment describes an educational tool system, which is otherwise referred to as 'the educational tool 100' or 'the system 100', for testing and demonstrating center of gravity based control. The education tool system comprising the swing 102 having the first swing end 412 and the second swing end 414; the rod assembly 110 operatively connected to the swing 102, wherein rotational changes of the rod assembly 110 cause the swing 102 to assume different poses; the motor 112 operatively connected to the rod assembly 110; the at least one encoder 202 configured to generate position signals; the interface box 802 operatively connected to the motor 112 and the at least one encoder 202; and the computing device 804 operatively connected to the interface box 802. The computing device 804 includes circuitry and program instructions, which when executed by one or more processors, are configured to receive the position signals from the interface box 802, analyze the position signals to determine the center of gravity of the swing 102 and the rod assembly 110 and generate motor control signals configured to adjust the swing 102 and the rod assembly 110 to the stable pose. The interface box 802 is configured to transmit the motor control signals to the motor 112 and transmit the position signals from the at least one encoder 202 to the computing device 804.

The educational tool system further comprising the stand 104 having the first stand end 302 and the second stand end 304; the first support blade 320 having the first lower end 322 and the first upper end 324, the first lower end 322 perpendicularly attached to the first stand end 302; the second support blade 330 having the second lower end 332 and the second upper end 334, the second lower end 332 perpendicularly attached to the second stand end 304, wherein the second support blade 330 is parallel to and extends in the same direction as the first support blade 320; the first adjustable strut 402 attached to the first upper end 324 of the first support blade 320 by the first bearing 346; the second adjustable strut 404 attached to the second upper end 334 of the second support blade 330 by the second bearing 356; and the first encoder 202A attached to the first adjustable strut 402 by the bracket 410.

The first adjustable strut 402 and the second adjustable 404 strut each have the plurality of adjustment holes configured for connecting the first adjustable strut 402 and the second adjustable strut 404 to different heights from the base 409 of the stand 104, wherein the first adjustment hole 406 and the second adjustment hole 408 are at equal heights from the base 409 of the stand 104. The first adjustment hole 406 of the first adjustable strut 402 is configured to receive the first bearing 346 and the second adjustment hole 408 of the second adjustable strut 404 is configured to receive the second bearing 356. The first adjustable strut 402 has the first upper strut end 422 having the first slot 424 configured to receive the first swing end 412. The second adjustable strut 404 has the second upper strut end 426 having the second slot 428 configured to receive the second swing end 414. Changing the adjustment holes 406, 408 of the first adjustable strut 402 and the second adjustable strut 404 to different heights from the base 409 of the stand 104 changes the center of gravity of the swing 102 and the rod assembly 110.

The educational tool system further comprising the gear housing 502 having the first wall 504 which extends perpendicularly from the swing 102, the first wall 504 having the first central bore 602, the lower wall 506 connected to the swing 102, and the upper wall 508 parallel to the lower wall 506, wherein the first wall 504, the lower wall 506 and the upper wall 508 form the C-shape; the gear frame 510 having the back wall 514, the lower end 518 of the back wall 514 attached to the first wall 504, the upper end 520 of the back wall 514 having the platform 522 extending parallel to the swing 102, the platform 522 having the second central bore 604; and the side wall 516 perpendicular to the back wall 514, the side wall 516 extending between the platform 522 and the swing 102; the drive shaft 530 extending from the motor 112, wherein the motor 112 is connected to the platform 522 so that the drive shaft 530 extends through the second central bore 604; the first axle 532 having the first axle end 606 and the second axle end 608; the first coupler 538 configured to operatively connect the drive shaft 530 to the first axle end 606; and the first gear 540 connected to the first axle 532 near the upper wall 508 of the gear housing 502, the second axle end 608 connected to the lower wall 506 of the gear housing 502.

The educational tool system further comprising the second encoder 202B having the third central bore 632; the second coupler 548; the first mount 552 connected to the swing 102, the first mount 552 having the fourth central bore 616; the second mount 554 connected to the swing 102, the second mount 554 having the fifth central bore 618; the cylindrical rod fixation 562 concentric with the cylindrical shaft 622, the cylindrical shaft 622 having the second encoder mating end 624 extending from the first side 626 of the cylindrical rod fixation 562 and the second coupler mating end 628 extending from the second side 630 of the cylindrical rod fixation 562, the cylindrical rod fixation 562 including the outer surface 578 having the threaded hole 636, wherein the second encoder mating end 624 of the cylindrical shaft 622 extends through the fourth central bore 616 of the first mount 552 and into the third central bore 632 of the second encoder 202B; the bushing 634 operatively connected to the second encoder 202B, the bushing 634 configured to hold the second encoder mating end 624 of the cylindrical shaft 622, wherein the second coupler mating end 628 of the cylindrical shaft 622 extends through the fifth central bore 618 of the second mount 554 and into the second coupler 548; the second axle 610 having the third axle end 612 and the fourth axle end 614, the third axle end 612 extending through the first central bore 602 and into the second coupler 548; the second gear 550 connected to the fourth axle end 614, wherein the second gear 550 is operatively meshed with the first gear 540; the rod assembly 110 including the rod 702 having the threaded end 704 and the extender end 706, wherein the threaded end 704 is configured to screw into the threaded hole 636 of the cylindrical rod fixation 562; the rod extender 710 having the tapered end 712 configured to press fit into the extender end 706 of the rod 702 and the threaded cavity end 716; the thread bar 720 having the rod extender end 722 configured to screw into the threaded cavity end 716, the thread bar 720 including position markings; and the disc shaped mass 730 having the threaded central bore 732, wherein the thread bar 720 is configured to engage with the threaded central bore 732 to position the disc shaped mass 730.

The computing device 804 includes the user interface 806 and the display 808. The user interface 806 is configured to receive user inputs, wherein the user inputs include the weight of the disc shaped mass 730, the height of one of the adjustment holes 406 or 408 from the stand 104, the first identification code of the first encoder 202A, the second identification code of the second encoder 202B, the position marking of the location of the disc shaped mass 730, the length of the rod 702, the motor control signal amplitude and the motor control signal frequency. The display 808 is configured to provide the indication of the stability of the pose of the swing 102.

Figure 12:
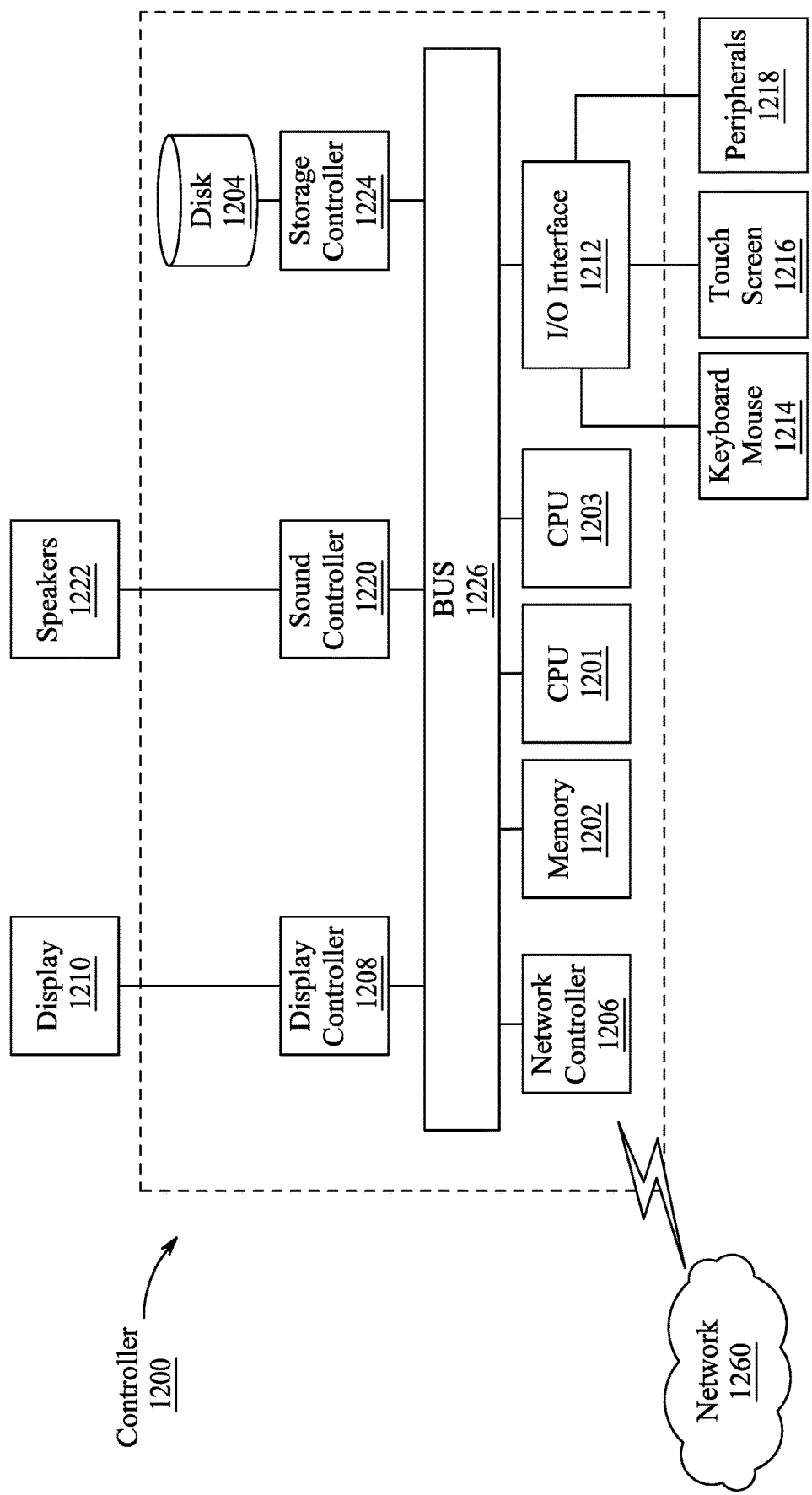
FIG. 12 is an illustration of a non-limiting example of details of computing hardware used in the computing system of FIG. 8, according to certain embodiments.

Further details of hardware description of the computing environment of FIG. 8 according to exemplary embodiments is described with reference to FIG. 12. In FIG. 12, a controller 1200 is described which is representative of the computing environment of FIG. 8 in which the controller 1200 is the computing device 804 which includes a CPU 1201 which performs the processes described above/below. The process data and instructions may be stored in memory 1202. These processes and instructions may also be stored on a storage medium disk 104 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1201, 1203 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 1201 or CPU 1203 may be a Xenon or Core processor from Intel of America or an Opteron processor from AMD of America, or may be other processor types that would be recognized by one of ordinary skill in the art. Alternatively, the CPU 1201, 1203 may be implemented on an FPGA, ASIC, PLD or using discrete logic circuits, as one of ordinary skill in the art would recognize. Further, CPU 1201, 1203 may be implemented as multiple processors cooperatively working in parallel to perform the instructions of the inventive processes described above.

The computing device in FIG. 12 also includes a network controller 1206, such as an Intel Ethernet PRO network interface card from Intel Corporation of America, for interfacing with network 1260. As can be appreciated, the network 1260 can be a public network, such as the Internet, or a private network such as an LAN or WAN network, or any combination thereof and can also include PSTN or ISDN sub-networks. The network 1260 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1208, such as a NVIDIA GeForce GTX or Quadro graphics adaptor from NVIDIA Corporation of America for interfacing with display 1210, such as a Hewlett Packard HPL2445w LCD monitor. A general purpose I/O interface 1212 interfaces with a keyboard and/or mouse 1214 as well as a touch screen panel 1216 on or separate from display 1210. General purpose I/O interface also connects to a variety of peripherals 1218 including printers and scanners, such as an OfficeJet or DeskJet from Hewlett Packard.

A sound controller 1220 is also provided in the computing device such as Sound Blaster X-Fi Titanium from Creative, to interface with speakers/microphone 1222 thereby providing sounds and/or music.

The general purpose storage controller 1224 connects the storage medium disk 1204 with communication bus 1226, which may be an ISA, EISA, VESA, PCI, or similar, for interconnecting all of the components of the computing device. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 13.

Figure 13:
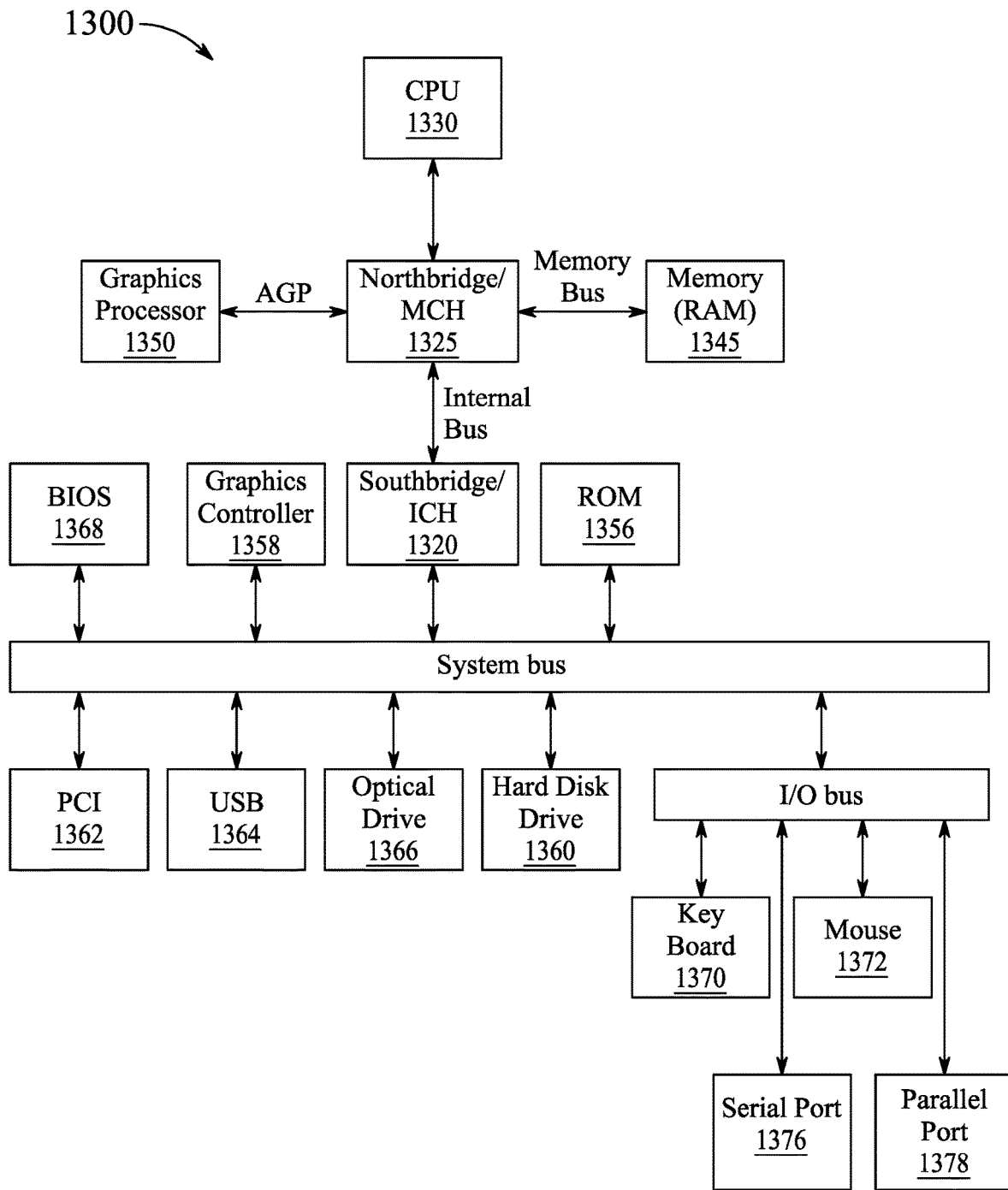
FIG. 13 is an exemplary schematic diagram of a data processing system used within the computing system, according to certain embodiments.

FIG. 13 shows a schematic diagram of a data processing system, according to certain embodiments, for performing the functions of the exemplary embodiments. The data processing system is an example of a computer in which code or instructions implementing the processes of the illustrative embodiments may be located.

In FIG. 13, data processing system 1300 employs a hub architecture including a north bridge and memory controller hub (NB/MCH) 1325 and a south bridge and input/output (I/O) controller hub (SB/ICH) 1320. The central processing unit (CPU) 1330 is connected to NB/MCH 1325. The NB/MCH 1325 also connects to the memory 1345 via a memory bus, and connects to the graphics processor 1350 via an accelerated graphics port (AGP). The NB/MCH 1325 also connects to the SB/ICH 1320 via an internal bus (e.g., a unified media interface or a direct media interface). The CPU Processing unit 1330 may contain one or more processors and even may be implemented using one or more heterogeneous processor systems.

Figure 14:
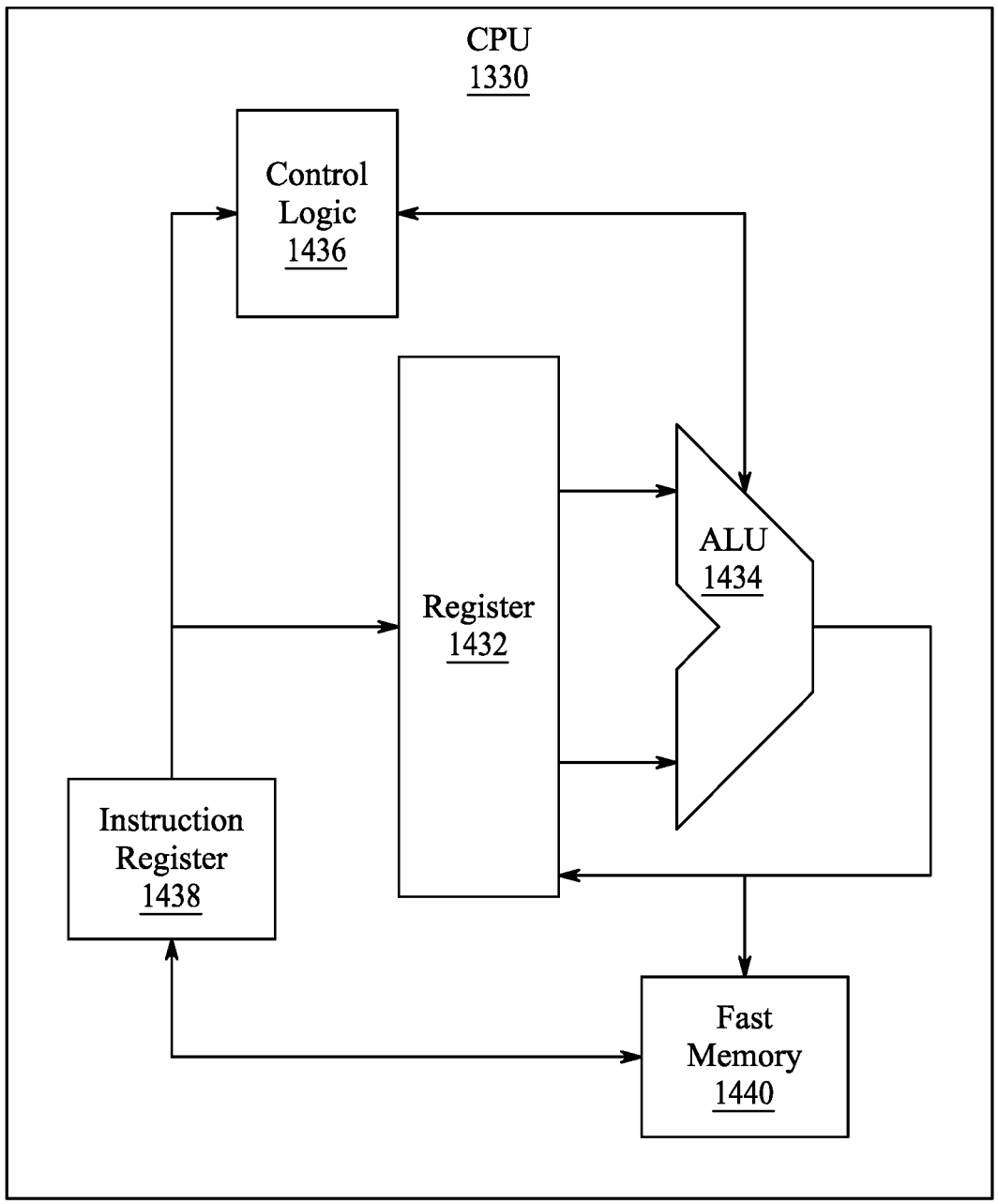
FIG. 14 is an exemplary schematic diagram of a processor used with the computing system, according to certain embodiments.

For example, FIG. 14 shows one implementation of CPU 1330. In one implementation, the instruction register 1438 retrieves instructions from the fast memory 1440. At least part of these instructions are fetched from the instruction register 1438 by the control logic 1436 and interpreted according to the instruction set architecture of the CPU 1330. Part of the instructions can also be directed to the register 1432. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1434 that loads values from the register 1432 and performs logical and mathematical operations on the loaded values according to the instructions. The results from these operations can be feedback into the register and/or stored in the fast memory 1440. According to certain implementations, the instruction set architecture of the CPU 1330 can use a reduced instruction set architecture, a complex instruction set architecture, a vector processor architecture, a very large instruction word architecture. Furthermore, the CPU 1330 can be standd on the Von Neuman model or the Harvard model. The CPU 1330 can be a digital signal processor, an FPGA, an ASIC, a PLA, a PLD, or a CPLD. Further, the CPU 1330 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 13, the data processing system 1300 can include that the SB/ICH 1320 is coupled through a system bus to an I/O Bus, a read only memory (ROM) 1356, universal serial bus (USB) port 1364, a flash binary input/output system (BIOS) 1368, and a graphics controller 1358. PCI/PCIe devices can also be coupled to SB/ICH 888 through a PCI bus 1362.

The PCI devices may include, for example, Ethernet adapters, add-in cards, and PC cards for notebook computers. The Hard disk drive 1360 and CD-ROM 1366 can use, for example, an integrated drive electronics (IDE) or serial advanced technology attachment (SATA) interface. In one implementation the I/O bus can include a super I/O (SIO) device.

Further, the hard disk drive (HDD) 1360 and optical drive 1366 can also be coupled to the SB/ICH 1320 through a system bus. In one implementation, a keyboard 1370, a mouse 1372, a parallel port 1378, and a serial port 1376 can be connected to the system bus through the I/O bus. Other peripherals and devices that can be connected to the SB/ICH 1320 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted with respect to changes in battery sizing and chemistry, or to meet the requirements of the intended back-up load to be powered.

Figure 15:
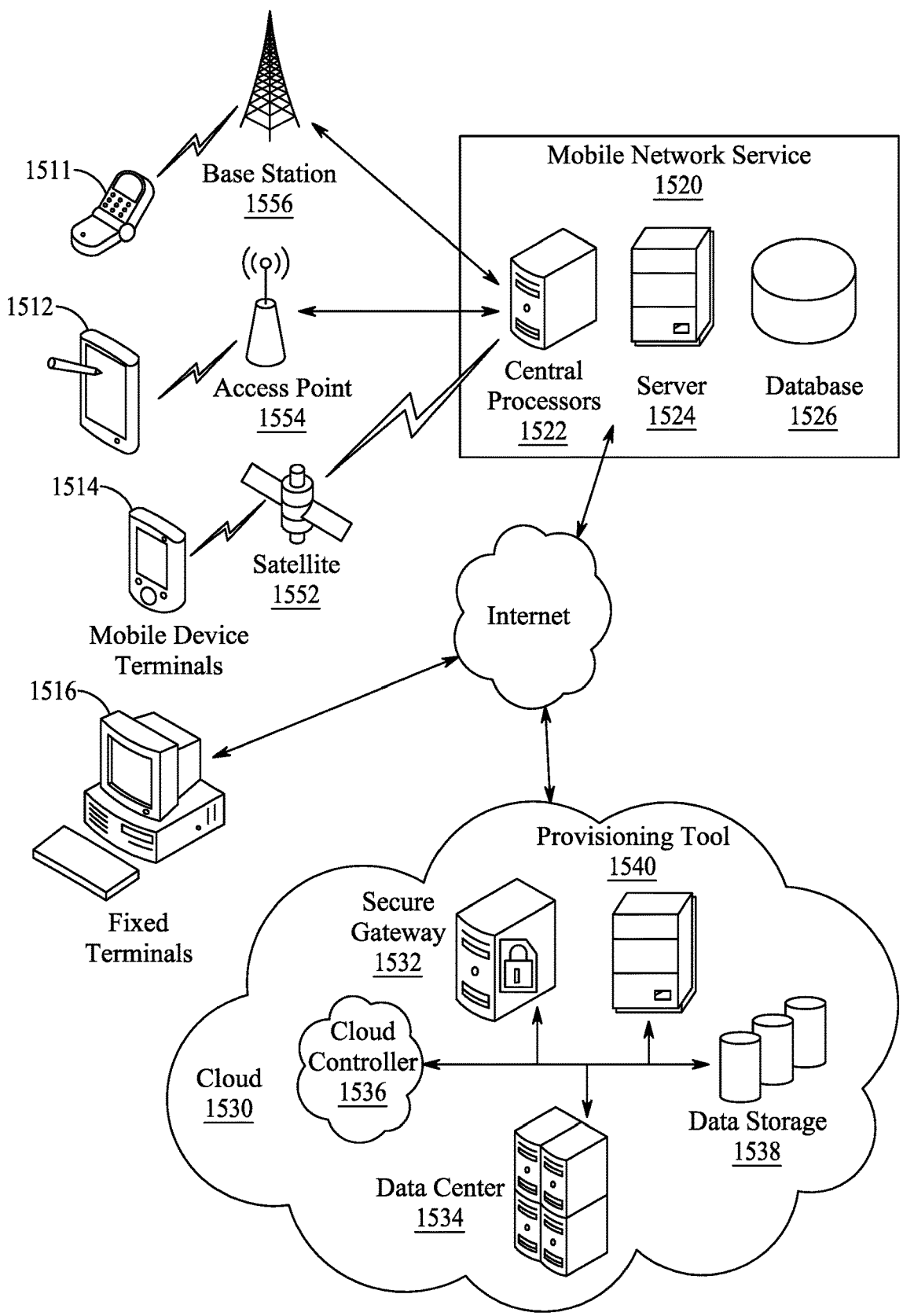
FIG. 15 is an illustration of a non-limiting example of distributed components which may share processing with the computing system, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 15, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. An educational tool for testing and demonstrating center of gravity based control, comprising:
    a swing having a first swing end and a second swing end;
    a rod assembly operatively connected to the swing;
    a motor operatively connected to the rod assembly;
    at least one encoder configured to generate position signals;
    an interface box operatively connected to the motor and the at least one encoder;
    a computing device operatively connected to the interface box;
    wherein the computing device includes circuitry and program instructions, which when executed by one or more processors, are configured to receive the position signals from the interface box, analyze the position signals to determine a center of gravity of the swing and the rod assembly and generate motor control signals configured to adjust the swing and the rod assembly to a stable pose; and
    wherein the interface box is configured to transmit the motor control signals to the motor and transmit the position signals from the at least one encoder to the computing device.

2. The educational tool of claim 1, further comprising:
    a stand having a first stand end and a second stand end;
    a first support blade having a first lower end and a first upper end, the first lower end perpendicularly attached to the first stand end; and
    a second support blade having a second lower end and a second upper end, the second lower end perpendicularly attached to the second stand end, wherein the second support blade is parallel to and extends in a same direction as the first support blade.

3. The educational tool of claim 2, further comprising:
    a first adjustable strut attached to the first upper end of the first support blade by a first bearing;
    a second adjustable strut attached to the second upper end of the second support blade by a second bearing; and
    a first encoder attached to the first adjustable strut by a bracket.

4. The educational tool of claim 3, wherein the first encoder is connected by one of a wireless connection and a wired connection to the interface box.

5. The educational tool of claim 3, wherein:
    the first adjustable strut and the second adjustable strut each have a plurality of adjustment holes, wherein a first adjustment hole of the first adjustable strut is configured to receive the first bearing and a second adjustment hole of the second adjustable strut is configured to receive the second bearing, wherein the first adjustment hole and the second adjustment hole are at equal heights from a base of the stand;
    the first adjustable strut has a first upper strut end having a first slot configured to receive the first swing end; and
    the second adjustable strut has a second upper strut end having a second slot configured to receive the second swing end.

6. The educational tool of claim 5, further comprising:
    a gear housing having a first wall which extends perpendicularly from the swing, the first wall having a first central bore, a lower wall connected to the swing, and an upper wall parallel to the lower wall, wherein the first wall, the lower wall and the upper wall form a C-shape;
    a gear frame having a back wall, a lower end of the back wall attached to the first wall, an upper end of the back wall having a platform extending parallel to the swing, the platform having a second central bore; and a side wall perpendicular to the back wall, the side wall extending between the platform and the swing;
    a drive shaft extending from the motor, wherein the motor is connected to the platform so that the drive shaft extends through the second central bore;
    a first axle having a first axle end and a second axle end;
    a first coupler configured to operatively connect the drive shaft to the first axle end; and
    a first gear connected to the first axle near the upper wall of the gear housing, and the second axle end connected to the lower wall of the gear housing.

7. The educational tool of claim 6, further comprising:
    a second encoder having a third central bore;
    a second coupler;
    a first mount connected to the swing, the first mount having a fourth central bore;
    a second mount connected to the swing, the second mount having a fifth central bore;
    a cylindrical rod fixation concentric with a cylindrical shaft, the cylindrical shaft having a second encoder mating end extending from a first side of the cylindrical rod fixation and a second coupler mating end extending from a second side of the cylindrical rod fixation, the cylindrical rod fixation including an outer surface having a threaded hole;

wherein the second encoder mating end of the cylindrical shaft extends through the fourth central bore of the first mount and into the third central bore of the second encoder;

a bushing operatively connected to the second encoder, the bushing configured to hold the second encoder mating end of the cylindrical shaft; and wherein the second coupler mating end of the cylindrical shaft extends through the fifth central bore of the second mount and into the second coupler.

8. The educational tool of claim 7, further comprising:

a second axle having a third axle end and a fourth axle end;

the third axle end extending through the first central bore and into the second coupler; and a second gear connected to the fourth axle end, wherein the second gear is operatively meshed with the first gear.

9. The educational tool of claim 8, further comprising:

the rod assembly including
- a rod having a threaded end and an extender end, wherein the threaded end is configured to screw into the threaded hole of the cylindrical rod fixation;
- a rod extender having a tapered end configured to press fit into the extender end of the rod and a threaded cavity end;
- a thread bar having a rod extender end configured to screw into the threaded cavity end, the thread bar including position markings; and
- a disc shaped mass having a threaded central bore, wherein the thread bar is configured to engage with the threaded central bore to position the disc shaped mass.

10. The educational tool of claim 9, wherein:

the computing device includes a user interface and a display;

the user interface is configured to receive user inputs, wherein the user inputs include a weight of the disc shaped mass, a height of one of the plurality of adjustment holes, a first identification code of the first encoder, a second identification code of the second encoder, the position marking of a location of the disc shaped mass, a length of the rod, a motor control signal amplitude and a motor control signal frequency; and the display is configured to provide an indication of a stability of a pose of the swing.

11. A method for testing and demonstrating center of gravity based control by an educational tool, comprising:

connecting a first adjustment hole of a first adjustable strut to a first upper end of a first support blade by a first bearing;

connecting a second adjustment hole of a second adjustable strut to a second upper end of a second support blade by a second bearing so that the first adjustment hole and the second adjustment hole are at equal heights from a stand holding the first support blade and the second support blade;

selecting a rod having a rod length;

screwing the rod into a threaded hole of a cylindrical rod fixation;

screwing a thread bar into a threaded cavity end of the rod;

selecting a disc shaped mass having a threaded central bore;

screwing the threaded central bore of the disc shaped mass onto the thread bar;

reading a position marking of the thread bar where the disc shaped mass intersects the thread bar;

connecting a first encoder to the first adjustable strut and a second encoder to the cylindrical rod fixation;

connecting the first encoder and the second encoder to an interface box;

connecting a motor to the interface box;

connecting a computing device to the interface box;

receiving, by the interface box, a first position signal from the first encoder and a second position signal from the second encoder;

transmitting, by the interface box, the first position signal and the second position signal to the computing device;

receiving, by the computing device, the first position signal and the second position signal;

receiving, by the computing device, a first identification code of the first encoder, a second identification code of the second encoder, a motor control signal amplitude and a motor control signal frequency;

receiving, by the computing device, a first set of user inputs including at least a height of an adjustment hole, the rod length, a weight of the disc shaped mass and the position marking;

analyzing, by the computing device, the first position signal, the second position signal and the first set of user inputs to determine a center of gravity of a swing and the rod;

generating motor control signals configured to adjust the center of gravity to a stable pose of the swing and the rod; and transmitting, by the interface box, the motor control signals to the motor.

12. The method of claim 11, further comprising:

inputting, at a user interface, programming instructions;

receiving, by the computing device which includes circuitry and one or more processors, the programming instructions;

executing, by the one or more processors, the programming instructions to determine the center of gravity of the swing and the rod; and generating, by the computing device, the motor control signals which adjust the center of gravity of the swing and the rod to a stable pose.

13. The method of claim 12, further comprising:

assigning a first stability metric to the stable pose of the swing and the rod;

receiving a second set of user inputs;

displaying, on a display of the computing device, a second pose of the swing and the rod based on the second set of user inputs;

determining, by the computing device, a second stability metric of the second pose;

comparing the second stability metric to the first stability metric;

when the second stability metric is not equal to the first stability metric, displaying a notification on the display that the second set of user inputs do not yield a stable configuration and a prompt to enter a third set of user inputs;

receiving the third set of user inputs;

displaying, on the display, a third pose of the swing and the rod;

determining, by the computing device, a third stability metric of the third pose;

comparing the third stability metric to the first stability metric;

when the third stability metric is not equal to the first stability metric, comparing the third stability metric to the second stability metric;

determining a relative stability between the second pose and the third pose; and displaying the first pose, the second pose and the third pose on the display with their respective stability metrics and user inputs.

14. The method of claim 11, further comprising:

actuating, by the motor control signals, the motor to rotate a drive shaft to turn a first gear;

turning, by the first gear, a second gear meshed with the first gear and connected to an axle;

rotating the axle by the second gear;

rotating, by the axle, a cylindrical shaft of a cylindrical rod fixation;

recording, by the first encoder, a first position signal of the first adjustable strut;

recording, by the second encoder, a second position signal of the cylindrical shaft; and transmitting the first position signal and the second position signal to the interface box.

15. An educational tool system for testing and demonstrating center of gravity based control, comprising:

a swing having a first swing end and a second swing end;

a rod assembly operatively connected to the swing, wherein rotational changes of the rod assembly cause the swing to assume different poses;

a motor operatively connected to the rod assembly;

at least one encoder configured to generate position signals;

an interface box operatively connected to the motor and the at least one encoder;

a computing device operatively connected to the interface box;

wherein the computing device includes circuitry and program instructions, which when executed by one or more processors, are configured to receive the position signals from the interface box, analyze the position signals to determine a center of gravity of the swing and the rod assembly and generate motor control signals configured to adjust the swing and the rod assembly to a stable pose; and wherein the interface box is configured to transmit the motor control signals to the motor and transmit the position signals from the at least one encoder to the computing device.

16. The educational tool system of claim 15, further comprising:

a stand having a first stand end and a second stand end;

a first support blade having a first lower end and a first upper end, the first lower end perpendicularly attached the first stand end;

a second support blade having a second lower end and a second upper end, the second lower end perpendicularly attached to the second stand end, wherein the second support blade is parallel to and extends in a same direction as the first support blade;

a first adjustable strut attached to the first upper end of the first support blade by a first bearing;

a second adjustable strut attached to the second upper end of the second support blade by a second bearing; and a first encoder attached to the first adjustable strut by a bracket.

17. The educational tool system of claim 16, wherein:

the first adjustable strut and the second adjustable strut each have a plurality of adjustment holes configured for connecting the first adjustable strut and the second adjustable strut to different heights from a base of the stand, wherein a first adjustment hole of the first adjustable strut and a second adjustment hole of the second adjustable strut are at equal heights from the base of the stand;

the first adjustment hole of the first adjustable strut is configured to receive the first bearing and the second adjustment hole of the second adjustable strut is configured to receive a second bearing;

the first adjustable strut has a first upper strut end having a first slot configured to receive the first swing end;

the second adjustable strut has a second upper strut end having a second slot configured to receive the second swing end; and wherein changing the plurality of adjustment holes of the first adjustable strut and the second adjustable strut to different heights from the base of the stand changes the center of gravity of the swing and the rod assembly.

18. The educational tool system of claim 17, further comprising:

a gear housing having a first wall which extends perpendicularly from the swing, the first wall having a first central bore, a lower wall connected to the swing, and an upper wall parallel to the lower wall, wherein the first wall, the lower wall and the upper wall form a C-shape;

a gear frame having a back wall, a lower end of the back wall attached to the first wall, an upper end of the back wall having a platform extending parallel to the swing, the platform having a second central bore; and a side wall perpendicular to the back wall, the side wall extending between the platform and the swing;

a drive shaft extending from the motor, wherein the motor is connected to the platform so that the drive shaft extends through the second central bore;

a first axle having a first axle end and a second axle end;

a first coupler configured to operatively connect the drive shaft to the first axle end; and a first gear connected to the first axle near the upper wall of the gear housing, and the second axle end connected to the lower end wall of the gear housing.

19. The educational tool system of claim 18, further comprising:

a second encoder having a third central bore;

a second coupler;

a first mount connected to the swing, the first mount having a fourth central bore;

a second mount connected to the swing, the second mount having a fifth central bore;

a cylindrical rod fixation concentric with a cylindrical shaft, the cylindrical shaft having a second encoder mating end extending from a first side of the cylindrical rod fixation and a second coupler mating end extending from a second side of the cylindrical rod fixation, the cylindrical rod fixation including an outer surface having a threaded hole;

wherein the second encoder mating end of the cylindrical shaft extends through the fourth central bore of the first mount and into the third central bore of the second encoder;

a bushing operatively connected to the second encoder, the bushing configured to hold the second encoder mating end of the cylindrical shaft;

wherein the second coupler mating end of the cylindrical shaft extends through the fifth central bore of the second mount and into the second coupler;

a second axle having a third axle end and a fourth axle end;

the third axle end extending through the first central bore and into the second coupler;

a second gear connected to the fourth axle end, wherein the second gear is operatively meshed with the first gear; and the rod assembly including:
- a rod having a threaded end and an extender end, wherein the threaded end is configured to screw into the threaded hole of the cylindrical rod fixation;
- a rod extender having a tapered end configured to press fit into the extender end of the rod and a threaded cavity end;
- a thread bar having a rod extender end configured to screw into the threaded cavity end, the thread bar including position markings; and
- a disc shaped mass having a threaded central bore, wherein the thread bar is configured to engage with the threaded central bore to position the disc shaped mass.

20. The educational tool system of claim 19, wherein:

the computing device includes a user interface and a display;

the user interface is configured to receive user inputs, wherein the user inputs include a weight of the disc shaped mass, a height of one of the plurality of adjustment holes, a first identification code of the first encoder, a second identification code of the second encoder, the position marking of a location of the disc shaped mass, a length of the rod, a motor control signal amplitude and a motor control signal frequency; and the display is configured to provide an indication of a stability of a pose of the swing.

* * * * *